United States Patent
Sakai

(10) Patent No.: US 8,704,495 B2
(45) Date of Patent: Apr. 22, 2014

(54) ONBOARD CHARGING CONTROL APPARATUS FOR CONTROLLING CHARGE TO SECONDARY BATTERY

(75) Inventor: Naoto Sakai, Kariya (JP)

(73) Assignee: Denso Corporation, Kariya (JP)

( * ) Notice: Subject to any disclaimer, the term of this patent is extended or adjusted under 35 U.S.C. 154(b) by 523 days.

(21) Appl. No.: 12/984,765

(22) Filed: Jan. 5, 2011

(65) Prior Publication Data

US 2011/0210698 A1 Sep. 1, 2011

(30) Foreign Application Priority Data

Feb. 26, 2010 (JP) .................. 2010-042656

(51) Int. Cl.
*H02J 7/04* (2006.01)
*B60K 6/20* (2007.10)
*B60W 10/24* (2006.01)

(52) U.S. Cl.
USPC ................ 320/155; 180/65.21; 180/65.29

(58) Field of Classification Search
USPC ............. 320/137, 155, 109; 180/65.1, 65.21, 180/65.265, 65.27, 65.275, 65.29; 701/22; 702/63; 903/903, 907

See application file for complete search history.

(56) References Cited

U.S. PATENT DOCUMENTS

| 7,515,133 B2 | 4/2009 | Usami |
| 2005/0046760 A1 | 3/2005 | Usami |
| 2010/0164439 A1* | 7/2010 | Ido .............................. 320/155 |

FOREIGN PATENT DOCUMENTS

| JP | 02-280633 | 11/1990 |
| JP | H09-019067 | 1/1997 |
| JP | 11-214046 | 8/1999 |
| JP | 2002-142378 | 5/2002 |
| JP | 2005-035381 | 2/2005 |
| JP | 2009-254221 | 10/2009 |

OTHER PUBLICATIONS

Office Action (2 pages) dated Aug. 6, 2013, issued in corresponding Japanese Application No. 2010-042656 and English translation (2 pages).

* cited by examiner

*Primary Examiner* — Richard V Muralidar
(74) *Attorney, Agent, or Firm* — Nixon & Vanderhye PC

(57) ABSTRACT

A vehicle has an ECU, a battery being chargeable with off-board electricity and a motor driven by electric power of the battery. The ECU has a microcomputer to receive an operation time each time a user sets the ECU in an operation state, prepare a frequency of operation times for each time zone, and set a time of the time zone corresponding to the high frequency as a charging end target time. When the microcomputer receives a signal from an onboard charger connected with an off-board power source, the microcomputer sets a charging schedule such that the battery charged by the charger according to the schedule is set in a fully-charged state at the charging end target time. The microcomputer controls the charger to charge the battery according to the schedule and to set the battery in the fully-charged state at the charging end target time.

17 Claims, 9 Drawing Sheets

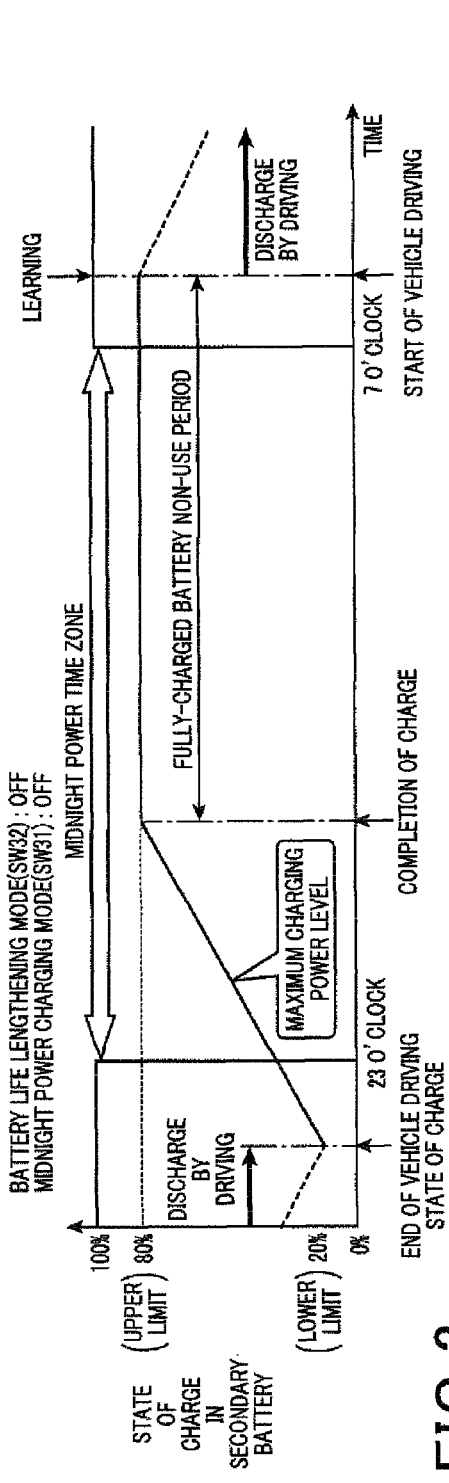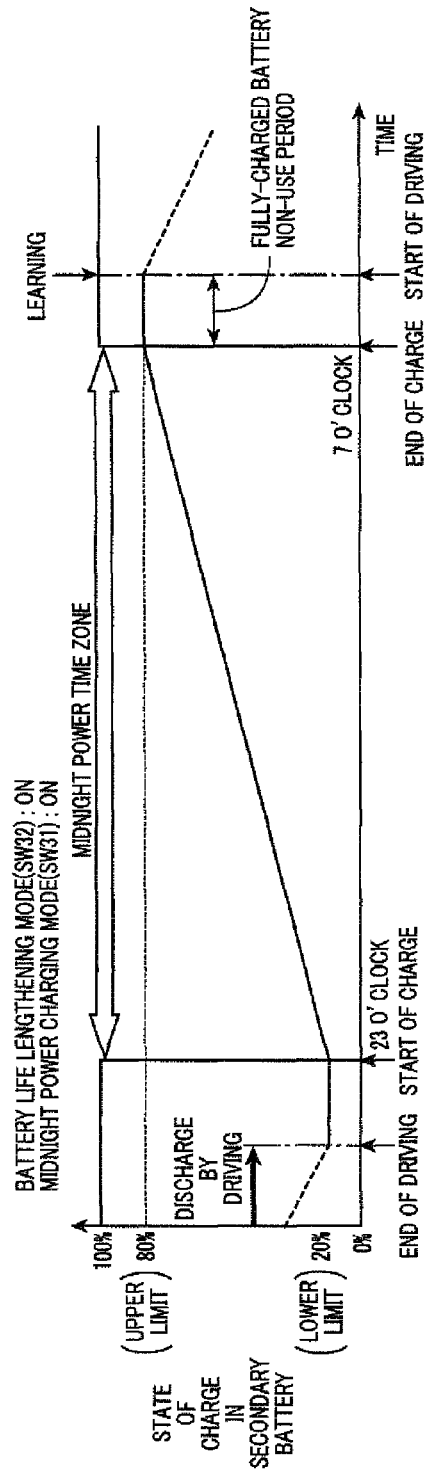

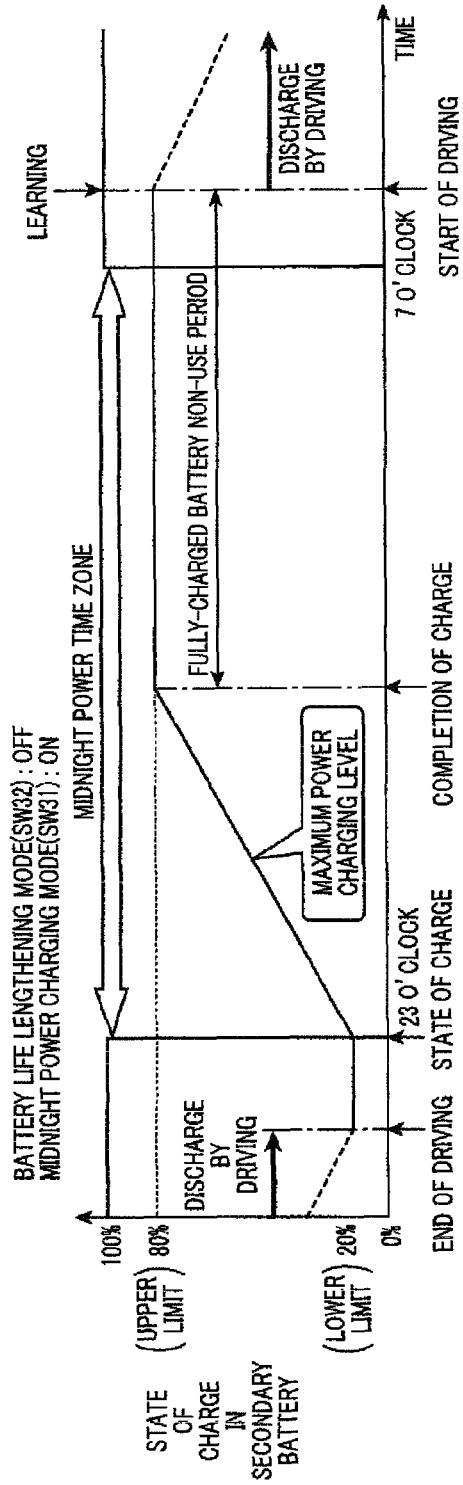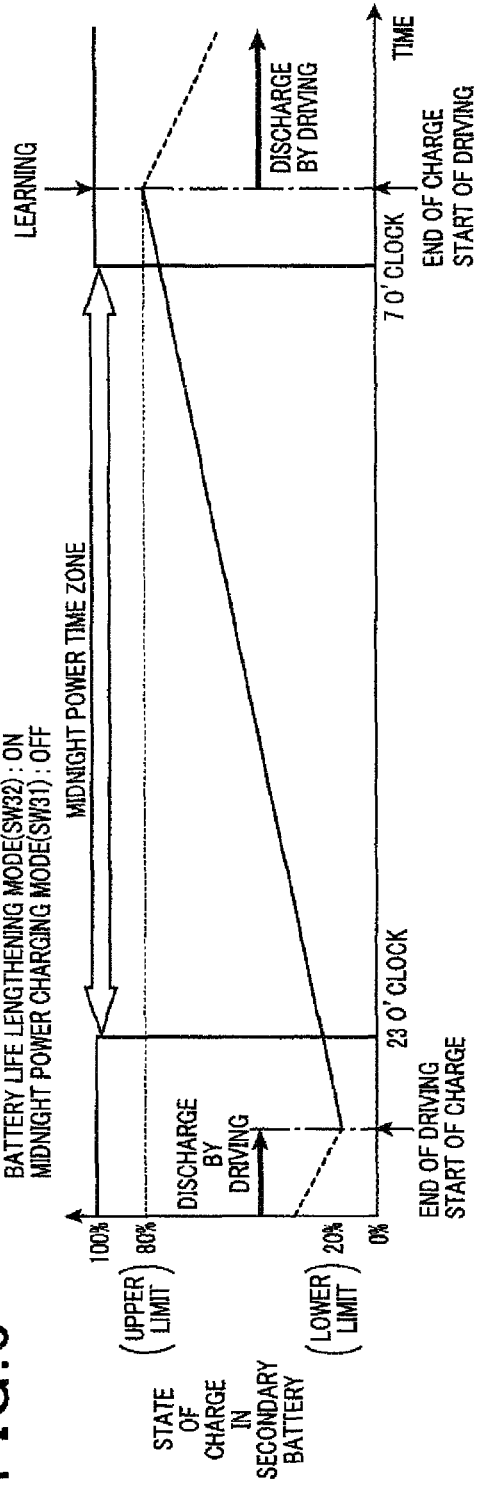

ONBOARD CHARGING CONTROL APPARATUS FOR CONTROLLING CHARGE TO SECONDARY BATTERY

CROSS-REFERENCE TO RELATED APPLICATION

This application is based upon and claims the benefit of priority of the prior Japanese Patent Application 2010-042656 filed on Feb. 26, 2010, so that the contents of which are incorporated herein by reference.

BACKGROUND OF THE INVENTION

1. Field of the Invention

The present invention relates to an onboard charging control apparatus which is mounted on a vehicle having a secondary battery being chargeable with off-board electricity and a motor driven by electric power of the battery and controls a charge to the battery.

2. Description of Related Art

In a type of vehicle, driving force required to run the vehicle can be obtained by driving a motor by electric power of a battery. Especially, in a recent year, for the purpose of environmental protection, conservation of resources, enhancement of fuel economy and the like, a vehicle with a motor-driving secondary battery being chargeable by an off-board (or external) power source such as a power source for domestic use has been proposed, and this vehicle has been already put to practical use.

As a type of vehicle having a secondary battery being chargeable with off-board electricity, for example, a plug-in hybrid vehicle (PHV) being able to obtain a driving force from both an engine and a motor, an electric vehicle (EV) obtaining a driving force only from a motor, and a fuel battery electric vehicle (FC) are well known. As a secondary battery for driving a motor, a nickel hydrogen battery and a lithium ion battery are, for example, well known.

Further, in this type of vehicle, for the convenience of users charging a secondary battery by off-board electricity, for example, a charging method has been improved to quickly charge the battery in a short time.

In contrast, when a quick charge is performed for the battery or when a battery fully charged is left as it is for a longtime without being used, it is well known that the battery life is considerably shortened. Therefore, it is important to provide a method and an apparatus for charging a secondary battery with off-board electricity while lengthening the battery life and maintaining the convenience of a user when charging.

Published Japanese Patent First Publication No. 2009-254221 discloses a technique as a charging method executed without shortening the battery life. In this technique, a user of a vehicle can manually set a date at which the user plans to drive the vehicle at the next time. When the user sets a date of the next driving at an end time of the current driving, a preliminary charge is performed for a battery to set the state of charge (SOC) in the battery at a predetermined level, and then a primary charge is performed for the battery at the night earlier than the next driving date to set the battery in the fully-charged state. Therefore, the period of time in which the battery is set in the fully-charged state can be shortened, so that the shortening of the battery life can be prevented.

However, in the technique disclosed in this Publication, it is required that the user himself or herself manually inputs a next driving date to the vehicle to set the date. Therefore, unless the user sets a next driving date after the completion of the current driving, the primary charge to the battery is immediately performed in response to the insertion of a plug of an off-board power source into the vehicle, and the battery is set in the fully-charged state. As a result, because there is a high probability that the battery fully charged is left for a long time without being used, the battery life is undesirably shortened at high probability.

SUMMARY OF THE INVENTION

A first object of the present invention is to provide, with due consideration to the drawbacks of the conventional charging method, an onboard charging control apparatus which controls a charge to a secondary battery of a vehicle being chargeable with off-board electricity while appropriately performing the charge according to the use of the vehicle and lengthening the battery life.

A second object of the present invention is to provide an onboard charging control apparatus which controls a charge to a secondary battery of a vehicle being chargeable with off-board electricity while reducing an electric rate in the charge and inconvenience in charging.

According to an aspect of this invention, the first object is achieved by the provision of an onboard charging control apparatus which is mounted on a vehicle having a secondary battery being chargeable with off-board electricity, a motor driven by electric power of the secondary battery, and a charger outputting a charging start signal in response to reception of the off-board electricity, comprising a present time outputting unit, a charging start signal receiving unit, an operation signal receiving unit, a charging end target time setting unit and a charging control unit. The present time outputting unit outputs a time signal indicating the present time. The charging start signal receiving unit receives the charging start signal. The operation signal receiving unit receives an operation signal indicating an operation state of the vehicle. The charging end target time setting unit receives the time signal in response to the reception of the operation signal in the operation signal receiving unit and sets a charging end target time based on the present time of the received time signal. The charging control unit receives the time signal in response to the reception of the charging start signal in the charging start signal receiving unit, and sets a charging schedule, based on the charging end target time and the present time of the time signal received in response to the reception of the charging start signal, such that the secondary battery charged according to the charging schedule is set in a state of charge, denoting a predetermined charging rate, in a charging end target time zone including the charging end target time. Further, the charging control unit produces a charging control signal indicating the charging schedule according to the time signal of the present time outputting unit, and outputs the charging control signal to the charger such that the charger performs charging of the secondary battery according to the charging schedule.

With this structure of the onboard charging control apparatus, the charging end target time is set based on the signal receiving time at which the operation signal is received, and the charging schedule is set based on the charging end target time. Therefore, in response to the charging schedule, the charger starts charging the secondary battery, for example, at the present time of the time signal received in response to the reception of the charging start signal to charge the secondary battery in the state of charge denoting the predetermined charging rate and to end the charge in the charging end target time zone including the charging end target time.

Because the charging end target time is set based on the signal receiving time at which the operation signal is received, there is a high probability that a user starts the driving of the motor at the charging end target time on other days. Therefore, when the charging end target time is set at user's operation time, at which the operation signal is received, or at a time close to user's operation time, a period of time from the charging end time, at which the secondary battery is set in the state of charge such as a fully-charged state, to the motor driving start time, at which the driving of the motor is actually started can be shortened.

Accordingly, the onboard charging control apparatus can control the charge to the secondary battery with off-board electricity while appropriately performing the charge according to the use of the vehicle and lengthening the battery life.

According to another aspect of this invention, the second object is achieved by the provision of an onboard charging control apparatus which is mounted on a vehicle having a secondary battery being chargeable with off-board electricity, a motor driven by electric power of the secondary battery, and a charger outputting a charging start signal in response to reception of the off-board electricity, comprising the present time outputting unit, the charging start signal receiving unit, and a charging control unit. The charging control unit sets a specific time zone, and sets a charging schedule, in response to the reception of the charging start signal in the charging start signal receiving unit, such that a charge to the secondary battery is performed in the specific time zone to set the secondary battery in a state of charge denoting a predetermined charging rate. Further, the charging control unit produces a charging control signal indicating the charging schedule according to the time signal of the present time outputting unit, and outputs the charging control signal to the charger such that the charger performs a charge to the secondary battery in the specific time zone according to the charging schedule.

With this structure of the onboard charging control apparatus, the charging schedule is set such that the charge to the secondary battery is performed in the specific time zone such as a midnight power time zone to set the secondary battery in a state of charge denoting a predetermined charging rate.

Therefore, when an electric rate in the charge is cheap in the specific time zone, the charge to the secondary battery can be automatically performed at a low rate. Accordingly, the onboard charging control apparatus can control the charge to the secondary battery with off-board electricity while reducing an electric rate in the charge and inconvenience in charging.

BRIEF DESCRIPTION OF THE DRAWINGS

FIG. 2 shows a change in the state of charge in a secondary battery when none of a midnight power charging mode and a battery life lengthening mode is set;

FIG. 3 shows a change in the state of charge in a secondary battery according to both a midnight power charging mode and a battery life lengthening mode;

FIG. 4 shows a change in the state of charge in a secondary battery according to a midnight power charging mode;

FIG. 5 shows a change in the state of charge in a secondary battery according to a battery life lengthening mode;

DETAILED DESCRIPTION OF THE PREFERRED EMBODIMENTS

Figure 1:
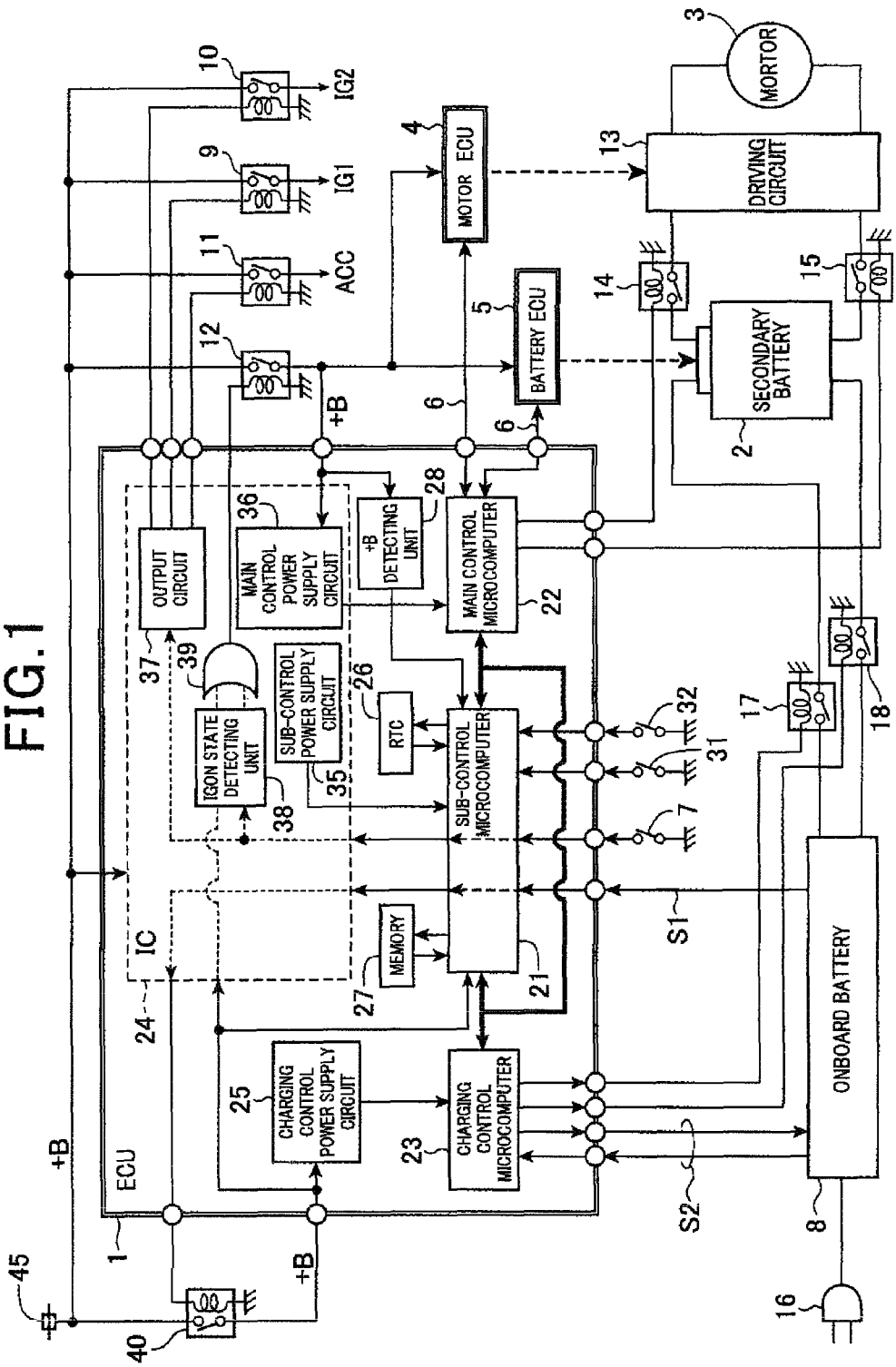
FIG. 1 is a block diagram of an electronic control unit (ECU) mounted on a vehicle according to the first embodiment of the present invention.

Embodiments of the present invention will now be described with reference to the accompanying drawings, in which like reference numerals indicate like parts, members or elements throughout the specification unless otherwise indicated.

First Embodiment

An electronic control unit (ECU) acting as an onboard charging control apparatus will be described. FIG. 1 is a block diagram of the ECU 1 according to the first embodiment. This ECU 1 is mounted on a vehicle such as a plug-in hybrid vehicle. Further, an internal combustion engine (not shown) acting as a driving power source is mounted on this vehicle to provide running force to the vehicle.

As shown in FIG. 1, the vehicle is provided with a secondary battery 2 and an electric motor 3 driven by electric power of the battery 2. The motor 3 also provides running force to the vehicle. The battery 2 can be charged by an off-board power source (not shown) such as a power source for domestic use. This off-board power source is located outside the vehicle and applies an alternating current voltage of 100V or 200V, used on business at an office or the like.

An onboard battery 45 applies a battery voltage +B to the ECU 1, and the ECU 1 is operated. This ECU 1 has a function for supplying the power of the battery voltage +B to running system ECUs such as a motor ECU 4, a battery ECU 5 and an engine ECU (not shown) to operate these ECUs, a function for performing data communication with the running system ECUs through an onboard network (e.g., a local area network) 6 to receive information from each of the running system ECUs and controlling each of the ECUs on the basis of the received information to control driving sources of the vehicle, a function for supplying the power of the battery voltage +B to ignition system ECUs such as a meter ECU IG1, a brake ECU IG2 and an air condition ECU (not shown) to operate the ECUs, a function for supplying the power of the battery voltage +B to devices ACC of an accessory system such as an audio device to operate the devices, a function for controlling the power supply of the battery voltage +B to each of the ECUs in response to an operation state of the ECU 1 changeable by user's operation for an operation state setting switch 7, and a function for controlling an onboard charger 8 to charge off-board electricity to the secondary battery 2.

Further, to control the charge to the secondary battery 2, the ECU 1 sets a charging schedule (i.e., a charging start target time, a charging end target time, a charging power level and the like) such that the battery 2 set in the fully-charged state is not left as it is for a long time and such that the battery 2 is charged in a midnight power time zone (or a midnight power time period) in which an electric rate in the charge is cheap.

The battery voltage +B is applied to the ECUs IG1 and TG2 of the ignition system ECUs through a first IG relay 9 and a second IG relay 10, respectively. The ECU 1 controls each of these relays 9 and 10 to be turned on and off. The reason that the ignition system receiving the voltage +B is divided into two groups is as follows. The power to be supplied to all ignition system ECUs exceeds a rated power of a single relay, and it is convenient to divide the ignition system ECUs on the basis of functions of the ECUs.

The battery voltage +B is applied to the devices ACC of the accessory system through an ACC relay 11. The battery voltage +B is applied to the running system ECUs such as the motor ECU 4 and the battery ECU 5 through a main relay 12. The ECU 1 controls each of the relays 11 and 12 to be turned on and off.

The secondary battery 2 acts as a power supply source required to drive the motor 3. A nickel hydrogen battery or a lithium ion battery is used as the battery 2. A driving circuit 13 converts the direct current of the power obtained from the battery 2 into an alternating current under control of the motor ECU 4 and supplies the power of the alternating current to the motor 3. Therefore, the motor 3 is driven. The motor ECU 4 controls the driving circuit 13 under control of the ECU 1 to control the torque generated in the motor 3 and a rotational speed in the motor 3.

The battery ECU 5 monitors the state of charge, voltage, temperature and the like in the secondary battery 2 and sends information about monitored results to the ECU 1. The ECU1 controls a charge to the battery 2 according to the information received from the ECU 5.

A positive electrode side motor relay 14 is disposed on a current-carrying line extending from the positive electrode of the battery 2 to the driving circuit 13. A negative electrode side motor relay 15 is disposed on a current-carrying line extending from the negative electrode of the battery 2 to the driving circuit 13. These relays 14 and 15 are controlled by the ECU 1 to be turned on and off.

The charger 8 receives electric power from the off-board power source when a detachable attachment plug 16 of the charger 8 is inserted into a socket outlet of the off-board power source. Because the charger 8 receives the alternating current voltage of 100V or 200V used on business, an alternating current (AC) to direct current (DC) converter or the like located in the charger 8 converts this alternating current voltage into a direct current voltage and charges electric power of this direct current voltage to the battery 2. The charger 8 has a fundamental function for producing the direct current voltage to charge electric power of this voltage to the battery 2, and an additional function for outputting a charging start signal S1 indicating the start of a charging power supply from the off-board power source in response to the insertion of the plug 16 into the off -board power source. Although the charger 8 can charge the battery 2 at a maximum charging power level allowed for the charger 8 and the battery 2, the charger 8 sometimes charges the battery 2 at a controlled charging power level which is set according to a charging control signal S2 transmitted from the ECU 1.

A positive electrode side charging relay 17 is disposed on a current-carrying line extending from the positive electrode of the charger 8 to the positive electrode of the battery 2. A negative electrode side charging relay 18 is disposed on a current-carrying line extending from the negative electrode of the charger 8 to the negative electrode of the battery 2. The ECU 1 controls each of these relays 17 and 18 to be turned on and off.

The ECU 1 is provided with a main control microcomputer 22, a sub-control microcomputer 21, a charging control microcomputer 23, a power source integrated circuit (IC) 24, a charging control power supply circuit 25, a real time clock (RTC) 26 representing a present time outputting unit, a memory 27, and a +B detecting unit 28. That is, this ECU 1 is a product which unifies functions of the plurality of microcomputers, and the control performed in each microcomputer differs from controls performed in the other microcomputers.

The IC 24 is provided with a main control power supply circuit 36 and a sub-control power supply circuit 35. The circuit 35 steps down the battery voltage +B, applied from the battery 45 at any time, to produce a sub-control power supply voltage set at a predetermined level and supplies electric power of this sub-control power supply voltage to the microcomputer 21 as a driving power. The circuit 36 steps down the battery voltage +B applied from the battery 45 through the relay 12 to produce a main control power supply voltage set at a predetermined level and supplies electric power of this main control power supply voltage to the microcomputer 22 as a driving power.

The IC 24 is further provided with an output circuit 37, an ignition on (IGON) state detecting unit 38, and an OR circuit 39. The circuit 37 controls the relays 9 to 11 according to a power supply control signal, received from the microcomputer 21, to selectively turn on each of the relays 9 to 11. The detecting unit 38 receives the power supply control signal from the microcomputer 21, produces a detection signal set at the high level when detecting the power supply control signal indicating the on state of the ignition in an IGON state denoting an operation state, produces a detection signal set at the low level when detecting the power supply control signal indicating the off state of the ignition in an OFF state or an only accessory on (ACCON) state, and outputs the detection signal to the circuit 39. The circuit 39 calculates the logic sum of the detection signal and a plug-in power supply notifying signal and outputs a signal indicating the calculated logic sum to the relay 12.

In the IC 24, the circuit 35 is configured so as to produce electric energy from electric power of the battery voltage +B and to constantly supply the electric energy, set at the sub-control power supply voltage, to the microcomputer 21. The microcomputer 21 is set in a sleep mode or a wakeup mode in response to each of operation states of the ECU 1. When the microcomputer 21 is set in the sleep mode, the electric energy supplied from the circuit 35 to the microcomputer 21 is minimized. Further, the circuit 35 is configured so as to constantly supply electric power of the sub-control power supply voltage to the RTC 26. Therefore, regardless of the operation state of the ECU 1, electric power of the battery voltage +B is supplied to the IC 24, and the RTC 26 is operated at any time.

When the main relay 12 is set in the off state, no electric power of the battery voltage +B is supplied to the circuit 36. Therefore, the circuit 36 is not operated, and electric power of the main control power supply voltage is not supplied to the microcomputer 22. In contrast, when the main relay 12 is turned on, the battery voltage +B is applied to the circuit 36, and the circuit 36 is operated so as to supply electric power of the main control power supply voltage to the microcomputer 22.

The sub-control microcomputer 21 has a power supply control function for controlling the power supply to each of elements (e.g., ACC, IG1, IG2 and the driving circuit 13) of the vehicle in response to an operation state of the ECU 1 changeable by user's operation for the switch 7 and the charging start signal S1 transmitted from the charger 8, and a charging control function for setting a charging schedule of the secondary battery 2 in response to the charging start signal S1 transmitted from the charger 8 and outputting a charging request corresponding to the charging schedule to the microcomputer 23.

The microcomputer 21 always receives electric power from the circuit 35 so as to be operated. When a sleep condition is satisfied in the vehicle, the microcomputer 21 is set to the sleep mode. In contrast, when the microcomputer 21 receives a charging start signal S1 from the charger 8, a time set in the RTC 26 comes or the user operates the switch 7 to set the ECU 1 in the IGON state, a wakeup condition is satisfied in the vehicle, and the microcomputer 21 is transferred to the wakeup mode.

During the sleep mode of the microcomputer 21, the microcomputer 21 performs only a signal receiving operation without performing any fundamental operation. Therefore, the microcomputer 21 stops the performance of various functions. In the signal receiving operation, the microcomputer 21 waits for a charging start signal S1 transmitted from the charger 8 to notify that the user intends to start a charge to the battery 2, an operation signal transmitted from the switch 7 to notify that the user operates the switch 7, and a setting time coming signal transmitted from the RTC 26 to notify that a setting time comes. Therefore, the microcomputer 21 is operated while consuming electric power at the minimum level. When the microcomputer 21 receives at least one of these signals, the microcomputer 21 is woken up to start performing the various functions of the microcomputer 21.

The switch 7 is a push button switch. Each time the user such as a driver of the vehicle operates or pushes down the switch 7, an operation signal notifying user's operation is transmitted from the switch 7 to the microcomputer 21, and the microcomputer 21 performs the power supply control in response to the operation signal. More specifically, each time the user pushes down the switch 7, the microcomputer 21 recognizes one of a plurality of operation states set by the user or determines one operation state, produces a power supply control signal set in a pattern corresponding to the recognized or determined operation state, and outputs this signal to the IC 24 to control the relays 9 to 12. The microcomputer 21 cyclically recognizes or determines the operation states of the ECU 1.

For example, there are a first operation state (i.e., OFF state) indicating the off state of all relays 9 to 12, a second operation state (i.e., ACCON state) indicating the on state of only the relay 11, and a third operation state (i.e., IGON state) indicating the on state of all relays 9 to 12. When the switch 7 is repeatedly pushed down, the microcomputer 21 cyclically recognizes or determines the operation states in the order of the OFF state, the ACCON state, the IGON state and the OFF state. When a special condition is satisfied in the vehicle, the OFF state is directly transferred to the IGON state in response to one signal transmitted from the switch 7.

Further, for example, when the user operates the switch 7 to set the OFF state, the microcomputer 21 is set in the sleep mode, and the driving of the engine and the motor 3 in the vehicle is stopped to stop the running of the vehicle. When the user changes the OFF state of the ECU 1 to the IGON state by operating the switch 7 twice, the microcomputer 21 is set in the wakeup mode, and the driving of the engine and/or the motor 3 is started to run the vehicle.

In the IC 24, in response to the power supply control signal of the microcomputer 21, the output circuit 37 drives each of the relays 9 to 11. For example, when the switch 7 is pushed down in the OFF state of the ECU 1, the output circuit 37 turns on only the relay 11 in response to the power supply control signal currently received from the microcomputer 21. Therefore, the vehicle is set in the ACCON state, and electric power of the battery voltage +B is supplied to devices of the accessory system through the relay 11.

Then, when the switch 7 is again pushed down in the ACCON state, the output circuit 37 additionally turns on the relays 9 and 10 in response to the power supply control signal of the microcomputer 21 indicating the on state of the ignition (i.e., IGON state). Further, the IGON state detecting unit 38 detecting this power supply control signal outputs the high level signal to the OR circuit 39, the OR circuit 39 outputs a main relay driving signal set at the high level to the relay 12, and the relay 12 is turned on. Therefore, electric power of the battery voltage +B is additionally supplied to ECUs of the ignition system and the ECUs 4 and 5 of the running system.

Then, when the switch 7 is further again pushed down in the IGON state, the output circuit 37 turns off the relays 9 to 11 together in response to the power supply control signal of the microcomputer 21 indicating the off state of the relays 9 to 12. Further, the IGON state detecting unit 38 detecting this power supply control signal outputs the low level signal to the OR circuit 39, the OR circuit 39 outputs a signal set at the low level to the relay 12, and the relay 12 is turned off.

When the main relay 12 is turned on, electric power of the battery voltage +B is supplied to the main control power supply circuit 36 of the ECU 1 in addition to the ECUs 4 and 5. Therefore, the circuit 36 starts the operation to supply electric power of the main control power supply voltage to the microcomputer 22, and the operation of the microcomputer 22 is started.

Further, when the main relay 12 is turned on, electric power of the battery voltage +B is supplied to the +B detecting unit 28 of the ECU 1. The unit 28 divides the battery voltage +B at a predetermined dividing ratio to produce a +B input signal, and outputs this signal to the microcomputer 21. In response to the B input signal, the microcomputer 21 judges that the main relay 12 is set in the on state.

As described above, when the ECU 1 is set in the IGON state in response to user s operation for the switch 7, the ECU 1 turns on the main relay 12.

Further, when the charger 8 is electrically connected with the off-board power source, a charging start signal S1 is transmitted from the charger 8 to the microcomputer 21, and the main relay 12 is turned on. More specifically, in response to the reception of the charging start signal S1 in the microcomputer 21, the microcomputer 21 outputs a charging start instruction to the IC 24. In response to this instruction, the IC 24 turns on a plug-in power relay 40. When the relay 40 is set in the on state, electric power of the battery voltage +B is supplied to the charging control power supply circuit 25 of the ECU 1 as a plug-in power supply notifying signal set at the high level. In response to this notifying signal, the circuit 25 is operated to supply electric power for a charging control to the charging control microcomputer 23 as a driving power. Therefore, in response to the power supply for the charging control, the operation of the microcomputer 23 is started.

Further, the plug-in power supply notifying signal is received in the OR circuit 39. Therefore, in response to this signal, the OR circuit 39 outputs the main relay driving signal set at the high level to the relay 12, the relay 12 is turned on, and electric power of the battery voltage +B is supplied to the ECUs of the running system and the circuit 36 of the ECU 1.

Moreover, the plug-in power supply notifying signal is received in the microcomputer 21. Therefore, in response to this signal, the microcomputer 21 can detect that the relay 40 is set in the on state and the circuit 25 and the microcomputer 23 are operated.

In conclusion, when the switch 7 is operated twice in the OFF state or when the charging start signal S1 is transmitted from the charger 8, the relay 12 is set in the on state.

Further, when the charger 8 outputs the charging start signal S1, the microcomputer 21 can receive the charging start signal S1 and the plug-in power supply notifying signal. Therefore, in response to the reception of one of the signals or the reception of both the signals, the microcomputer 21 can recognize that the charger 8 is set in a standby state to charge off-board electricity to the battery 2. Accordingly, the microcomputer 21 can reliably recognize the standby state of the charger 8 and can reliably output a control instruction required for the charging control.

The RTC 26 is a well-known time managing device and is always operated. The microcomputer 21 can receive a present time (e.g., a year, a month, a day, a day of the week, a clock, a minute and a second) from the RTC 26, if necessary. Further, the microcomputer 21 can receive a setting time coming signal indicating the coming of a setting time from the RTC 26 when the setting time comes. More specifically, the microcomputer 21 sets a specific time in the RTC 26. When the setting time comes, the RTC 26 outputs a setting time coming signal to the microcomputer 21 to notify the microcomputer 21 of the coming of the setting time. Even when the microcomputer 21 is set in the sleep mode, the microcomputer 21 can receive this signal. When receiving the signal, the microcomputer 21 is woken up to start its operation.

The vehicle is further provided with a first charging mode setting switch 31 and a second charging mode setting switch 32. The microcomputer 21 receives states of the switches 31 and 32. In this embodiment, the ECU 1 is set in a midnight power charging mode (i.e., a first charging mode) in response to the on state of the switch 31, and the ECU 1 is set in a battery life lengthening mode (i.e., a second charging mode) in response to the on state of the switch 32. The ECU 1 is set in both the modes in response to the on states of the switches 31 and 32. The ECU 1 is not set in any mode in response to the off states of the switches 31 and 32.

In the midnight power charging mode (hereinafter, merely called a midnight power mode), the secondary battery 2 is charged with electric power for a specific period of time at midnight (hereinafter, called the midnight power time zone) to start and end this charge in the midnight power time zone. An electric rate in the midnight power time zone is cheap. For example, the midnight power time zone starts at 23 o'clock and ends at 7 o'clock in the tomorrow morning. Information (e.g., a charging start target time and a charging end target time) about the midnight power mode is stored in the memory 27 in advance. For example, the charging start target time is set at the start time (i.e., 23 o'clock) of the midnight power time zone. The charging end target time is set at the end time (i.e., 7 o'clock in the tomorrow morning) of the midnight power time zone, or no charging end target time is set because the charge to the battery 2 is ended when the battery 2 is set in the fully-charged state.

In the battery life lengthening mode (hereinafter, merely called the life lengthening mode), the microcomputer 21 sets a controlled charging schedule including a charging start target time, a charging end target time and a controlled charging power level indicating a quantity of electricity to be charged per unit of time. More specifically, the charging schedule is set such that the secondary battery 2 charged at the controlled charging power level is set in the fully-charged state at the charging end target time or in a charging end target time zone, including the charging end target time, when the charge to the battery 2 is started at the charging start target time. The time length of the charging end target time zone is, for example, set at thirty minutes. Therefore, the secondary battery 2 is actually charged according to the charging schedule so as to be fully charged at the charging end target time or in the charging end target time zone. The charging end target time is, for example, appropriately set to precede and be close to a motor driving start time at which the user usually starts the driving of the motor 3 to go out by using the vehicle. In this case, because the period of time from the charging end target time to the motor driving start time is short, the charge in this mode can prevent the secondary battery 2 set in the fully-charged state from being left as it is for a long time. Further, the charging start target time is, for example, set at a motor driving stop time. In this case, a period of time from the charging start target time to the charging end target time is usually set so as to be sufficiently long. Therefore, the secondary battery 2 can be gradually charged at a comparatively low controlled charging power level. Accordingly, the life of the secondary battery 2 can be lengthened.

Information (e.g., a charging end target time) about the life lengthening mode is stored in the memory 27 in advance. Each time the microcomputer 21 recognizes the IGON state indicated by user's operation for the switch 7 or each time the unit 28 outputs the +B input signal to the microcomputer 21 in response to the setting of the IGON state, the microcomputer 21 receives the present time from the RTC 26 and stores this present time as a candidate of the charging end target time and determines the charging end target time from the candidates. Alternatively, the microcomputer 21 stores the present time as a candidate of the charging end target time to determine the charging end target time, in response to both the recognition of the IGON state and the reception of the +B input signal.

The main control microcomputer 22 has a function for controlling the ECUs (e.g., the motor ECU 4 and the battery ECU 5) of the running system. The operation of the microcomputer 22 is stopped when the relay 12 is set in the off state (OFF state or ACCON state). When the switch 7 is operated twice in the OFF state or when the charging start signal S1 is transmitted from the charger 8 to the ECU 1, electric power of the battery voltage +B is supplied to the microcomputer 22 through the relay 12, and the operation of the microcomputer 22 is started.

The microcomputer 22 communicates with the motor ECU 4 and the battery ECU 5 through the network 6 to receive and transmit data from/to the ECUs 4 and 5, to control the motor 3 through the relays 14 and 15 and the driving circuit 13, to monitor the state of charge in the secondary battery 2, and to control the battery 2. The microcomputer 22 receives information such as the state of charge in the secondary battery 2 from the ECU 5. This received information is used in the microcomputer 21. The microcomputer 22 performs the data communication with other ECUs such as an engine ECU (not shown). Therefore, the microcomputer 22 performs general control for the ECUs of the running system.

When the operation of the charging control microcomputer 23 is started in response to the charging start signal S1 transmitted from the charger 8, the microcomputer 23 controls the charger 8 to perform the charge with off-board electricity to the secondary battery 2. This microcomputer 23 determines no charging schedule in the control of the charger 8, but the microcomputer 23 receives a charging request instruction indicating the charging schedule from the microcomputer 21 and outputs a charging control signal S2 indicating the charging schedule to the charger 8 to control the charger 8.

The onboard charger 8 charges electric power of the off-board power source to the secondary battery 2 according to the charging control signal S2 of the microcomputer 23 to perform this charge according to the charging schedule set by the microcomputer 21. To perform the charge to the battery 2, the microcomputer 23 turns on the relays 17 and 18 to electrically connect the charger 8 and the battery 2 through high-voltage lines. Therefore, the charger 8 can perform the charge to the battery 2. When the charger 8 performs no charge to the battery 2, the relays 17 and 18 are set in the off state together.

The microcomputers 21 to 23 perform DMA (direct memory access) communication with one another to transmit data among the microcomputers 21 to 23. For example, the charging request instruction indicating the charging schedule is transmitted from the microcomputer 21 to the microcomputer 23. Further, the microcomputer 22 receives information (e.g., the state of charge in the battery 2) about the battery 2 from the battery ECU 5, and the microcomputer 21 receives at least the state of charge in the battery 2, contained in the information, from the microcomputer 22 in the DMA communication. Therefore, the microcomputer 21 can sets the charging schedule or the like by using the state of charge in the battery 2.

As described above, the ECU 1 has a plurality of microcomputers such as the microcomputers 21 to 23, and the function of each microcomputer differs from the functions of the other microcomputers. Therefore, dark currents in the ECU 1 can be reduced, and the reliability in the control performed in the ECUs of the running system can be enhanced. More specifically, although the ECU 1 has the microcomputers 21 to 23, only the microcomputer 21 is operated at any time, and operations of the other microcomputers 22 and 23 are stopped when the microcomputer 21 recognizes or determines the OFF state of the ECU 1. Accordingly, dark currents in the microcomputers 22 and 23 can be reduced, and electric power consumed in the ECU 1 can be reduced. Further, only the microcomputer 22 controls the ECUs (e.g., the ECUs 4 and 5) of the running system which is most important in the vehicle. Accordingly, the reliability in the ECUs of the running system can be enhanced. Moreover, the microcomputers 21 and 23 monitor the operation of the microcomputer 22 to control the charge to the battery 2 while considering the operation of the microcomputer 22. Accordingly, the reliability in the ECUs of the running system can be further enhanced.

Next, the control of the charge to the battery 2 mainly performed by the microcomputer 21 will be described with reference to FIG. 1.

When the user inserts the plug 16 of the charger 8 into a socket outlet of the off-board power source such as a charging station, a charging electric power is supplied to the charger 8, and the charger 8 outputs a charging start signal S1 to the microcomputer 21 of the ECU 1. In response to this signal, the microcomputer 21 set in the sleep mode is woken up to output a charging start instruction to the IC 24, and the IC 24 turns on the relay 40. In response to the turning-on of the relay 40, the circuit 25 receives a plug-in power supply notifying signal and outputs electric power for a charging control to the microcomputer 23, and the operation of the microcomputer 23 is started. Further, the OR circuit 39 of the IC 24 receives the plug-in power supply notifying signal and outputs a main relay driving signal set at the high level to the relay 12, and the relay 12 is turned on.

In response to the turning-on of the relay 12, the circuit 36 of the ECU 1 receives the battery voltage +B and starts the operation so as to start the operation of the microcomputer 22. Further, the running system ECUs such as the ECU 4 and the ECU 5 receives the battery voltage +B through the relay 12, and the operation of the ECUs is started. Then, the microcomputer 22 receives the state of charge in the secondary battery 2 from the ECU 5, and the microcomputer 21 receives the state of charge from the microcomputer 22 in the DMA communication. Therefore, the preparation for the charging control in the microcomputer 21 is completed.

Thereafter, the microcomputer 21 detects the states of the switches 31 and 32 and calculates a charging schedule based on the states of the switches 31 and 32. More specifically, when only the switch 31 is set in the on state, the microcomputer 21 judges that the ECU 1 is set in the midnight power mode, and the microcomputer 21 calculates a charging schedule according to this midnight power mode. When only the switch 32 is set in the on state, the microcomputer 21 judges that the ECU 1 is set in the life lengthening mode, and the microcomputer 21 calculates a charging schedule according to this life lengthening mode. When the switches 31 and 32 are set in the on state together, the microcomputer 21 judges that the ECU 1 is set in both the modes, and the microcomputer 21 calculates a charging schedule according to the modes. When the switches 31 and 32 are set in the off state together, the microcomputer 21 judges that the ECU 1 is not set in either the charging mode or the lengthening mode, and the microcomputer 21 calculates a charging schedule according to a third charging mode. Then, the microcomputer 21 outputs a charging request instruction, indicating the charging schedule, to the microcomputer 23 in the DMA communication.

In response to the charging request instruction, the microcomputer 23 outputs a charging control signal S2 corresponding to the instruction (i.e., the charging schedule) to the charger 8, and turns on the relays 17 and 18. Therefore, the charger 8 starts charging off-board electricity of the off-board power source to the secondary battery 2 according to the charging control signal S2. For example, this signal is a duty signal. The duty ratio in the duty signal corresponds to the controlled charging power level indicated by the charging schedule.

After the start of this charging, the microcomputer 21 cooperated with the microcomputer 22 continues monitoring the state of charge in the secondary battery 2. When the battery 2 is set in the fully-charged state, the microcomputer 23 cooperated with the microcomputer 21 controls the charger 8 to stop the charge to the battery 2. In this embodiment, the fully-charged state denotes a target charging rate (or a target charged energy). This target charging rate (or the target charged energy) is, for example, set at 80% of a maximum charging rate (or a maximum charged energy) allowed for the battery 2.

Next, the setting of the charging schedule in the sub-control microcomputer 21 will be described.

In this embodiment, when the microcomputer 21 is woken up, the microcomputer 21 judges whether this wakeup is performed in response to user's operation for the switch 7 or a charging start signal S1 transmitted from the charger 8.

Further, the microcomputer 21 performs a learning operation in which the microcomputer 21 receives the present time from the RTC 26 as a motor driving start time each time the ECU 1 is set in the IGON state in response to user's operation for the switch 7, and determines a charging end target time from the motor driving start times. The ECU 1 controls the charging operation for the secondary battery 2 while considering the charging end target time.

More specifically, when the user running the vehicle arrives at the user's house, the user operates the switch 7 to stop the driving of the engine 3. In response to this driving stop, the ECU 1 of the vehicle sets the relays 9 to 12 in the off state and is itself then set in the OFF state. Thereafter, when the user operates the switch 7 twice in the OFF state of the ECU 1, the ECU 1 is transferred to the IGON state. In response to the IGON state, the microcomputer 21 judges that the user operates the switch 7 to start driving the motor 3 (or to start driving the engine and the motor 3), and receives the present time from the RTC 26. The microcomputer 21 stores this present time as a motor driving start time in a memory 27 each time the motor driving is started. Then, the microcomputer 21 prepares a frequency of the motor driving start times for each time zone from a record of the motor driving start times. That is, each time the user operates the switch 7 twice at a motor driving start time to set the ECU 1 in the IGON state for the purpose of running the vehicle, information about the motor driving start time is accumulated. Further, the microcomputer 21 selects a specific time zone corresponding to one high frequency from the time zones, determines a representative point (e.g., the middle point) of the specific time zone, sets the representative point as a charging end target time, and stores the charging end target time in the memory 27.

In this embodiment, when a frequency corresponding to a first time zone (e.g., a time zone around 2 o'clock at midnight) placed in the midnight power time zone is high while a frequency corresponding to a second time zone (e.g., a time zone around 8 o'clock in the morning) placed out of the midnight power time zone is also high, the microcomputer 21 sets the representative point of the first time zone as a first charging end target time, and sets the representative point of the second time zone as a second charging end target time. In contrast, when a frequency corresponding to a second time zone placed out of the midnight power time zone is high while none of the frequencies corresponding to the time zones placed in the midnight power time zone is high, the microcomputer 21 sets the representative point of the second time zone as a second charging end target time while not setting any first charging end target time.

Therefore, as a result of the learning operation, the microcomputer 21 sets and stores only the charging end target time or both the first and second charging end target times. For example, when the user starts driving the motor 3 almost at 8 o'clock in the morning to go to the place of employment while rarely starting the driving of the motor 3 in the midnight power time zone, the ECU 1 sets only the second charging end target time. In contrast, when the user sometimes starts driving the motor 3 in the midnight power time zone while frequently going to the place of employment around 8 o'clock by the vehicle, the ECU 1 sets both the first and second charging end target times. When the ECU 1 sets both the first and second charging end target times, there is a high probability that the user goes out by the vehicle at each of the first and second charging end target times.

In this embodiment, when the ECU 1 is set in the life lengthening mode without being set in the midnight power mode, the microcomputer 21 automatically sets the reception time of a charging start signal S1 transmitted from the charger 8 as a charging start target time. In this mode setting, when the ECU 1 sets only the second charging end target time, the microcomputer 21 sets a charging schedule such that a charge to the battery 2 is started at the charging start target time and is ended in a charging end target time zone including the second charging end target time. Then, the microcomputer 21 calculates a controlled charging power level in the charging schedule such that the battery 2 constantly charged at the controlled charging power level is almost set in the fully-charged state at the second charging end target time. The ECU 1 controls the charger 8 to charge the battery 2 at the controlled charging power level, to set the battery 2 in the fully-charged state almost at the charging end target time and to end the charge when the battery 2 is set in the fully-charged state or the charging end target time actually comes.

In this case, because the charging end target time is set to be close to a motor driving start time of the next motor driving, a fully-charged battery non-use period of time started at the time the battery 2 is actually set in the fully-charged state and is ended at the motor driving start time of the next motor driving can be set to be shorter than a predetermined threshold of the non-use period. Further, Because the charging period of time from the charging start target time to the second charging end target time is sufficiently long to set the battery 2 in the fully-charged state, the controlled charging power level is sufficiently lower than the maximum charging power level. Accordingly, the life of the battery 2 can be lengthened.

Further, when the ECU 1 set only in the life lengthening mode sets both the first and second charging end target times, the microcomputer 21 sets a charging schedule corresponding to both a primary charge and a secondary charge. The primary charge is started at the charging start target time and is ended at the first charging end target time. The secondary charge is started at the first charging end target time and is ended in a charging end target time zone including the second charging end target time. Then, the microcomputer 21 calculates a first charging power level in the primary charge such that the primary charge to the battery 2 at the first charging power level sets the battery 2 in a predetermined state of charge, and calculates a second charging power level in the secondary charge such that the secondary charge to the battery 2 at the second charging power level sets the battery 2 in the fully-charged state. The ECU 1 controls the charger 8 to perform the primary charge to the battery 2 at the first charging power level, to perform the secondary charge to the battery 2 at the second charging power level, to set the battery 2 in the fully-charged state almost at the second charging end target time and to end the charge when the battery 2 is set in the fully-charged state or the second charging end target time actually comes. In this case, the fully-charged battery non-use period of time can be set to be shorter than the predetermined threshold of the non-use period.

Therefore, because the ECU 2 controls the charger 8 to perform the primary charge at the first charging power level, the battery 2 can be set in a practically useful charging state at the first charging end target time. Accordingly, even when the user is unexpectedly required to run the vehicle at midnight, the user can reliably run the vehicle. Further, because of the first and second charging power levels, the life of the battery 2 can be lengthened.

When the ECU 1 set in the midnight power mode without being set in the life lengthening mode receives a charging start signal S1 from the charger 8 before the midnight power time zone, the microcomputer 21 sets a charging schedule such that a charge to the battery 2 started at the start time (e.g., 23 o'clock) of the midnight power time zone is performed at the maximum charging power level and is ended when the battery 2 is set in the fully-charged state. The ECU 1 controls the charger 8 to start a charge to the battery 2 at the start time of the midnight power time zone and to perform the charge at the maximum charging power level.

Therefore, because the midnight power time zone is sufficiently long to set the battery 2 in the fully-charged state, the battery 2 can be reliably set in the fully-charged state in the midnight power time zone while reducing an electric rate in the charge.

In contrast, when the ECU 1 set in the midnight power mode without being set in the life lengthening mode receives a charging start signal S1 from the charger 8 during the midnight power time zone, the microcomputer 21 automatically sets the reception time of the charging start signal S1 as a charging start target time and sets a charging schedule such that a charge to the battery 2 started at the charging start target time is performed at the maximum charging power level and is ended when the battery 2 is set in the fully-charged state or the end time of the midnight power time zone actually comes. The ECU 1 controls the charger 8 to start a charge to the battery 2 at the charging start target time and to perform the charge at the maximum charging power level. Therefore, the battery 2 can be normally set in the fully-charged state in the midnight power time zone while reducing an electric rate in the charge as much as possible.

When the ECU 1 set in both the midnight power mode and the life lengthening mode receives a charging start signal S1 from the charger 8 before the midnight power time zone, the microcomputer 21 automatically sets the start time (23 o'clock) of the midnight power time zone as a charging start target time. When the ECU 1 receives a charging start signal S1 from the charger 8 during the midnight power time zone, the microcomputer 21 automatically sets the reception time of the charging start signal 21 as a charging start target time.

In this mode setting, when the microcomputer 21 sets no first charging end target time, the microcomputer 21 sets a charging schedule such that a charge to the secondary battery 2 is started at the charging start target time and ended at the end time (e.g., 23 o'clock) of the midnight power time zone. Then, the microcomputer 21 calculates a controlled charging power level in the charging schedule such that the battery 2 constantly charged at the controlled charging power level in the charge is almost set in the fully-charged state at the end time of the midnight power time zone. The ECU 1 controls the charger 8 to start a charge to the battery 2 at the charging start target time, to charge the battery 2 at the controlled charging power level, to set the battery 2 in the fully-charged state almost at the end time of the midnight power time zone and to end the charge when the battery 2 is set in the fully-charged state or the end time of the midnight power time zone actually comes. The fully-charged battery non-use period can be shorter than the predetermined threshold of the non-use period.

Because the midnight power time zone is sufficiently long to set the battery 2 in the fully-charged state, the controlled charging power level can be set to be sufficiently lower than the maximum charging power level. Accordingly, the life of the battery 2 can be lengthened. Further, because the charge is performed in the midnight power time zone, an electric rate in the charge can be reduced.

In contrast, when the microcomputer 21 sets the first charging end target time in the ECU 1 set in both the midnight power mode and the life lengthening mode, the microcomputer 21 sets a charging schedule such that a primary charge to the battery 2 started at the charging start target time and ended at the first charging end target time is performed at a predetermined charging power level such as the maximum charging power level and such that a secondary charge to the battery 2 started at the first charging end target time and ended at the end time of the midnight power time zone is performed at a controlled charging power level. Then, the microcomputer 21 calculates the controlled charging power level such that the battery 2 charged at the controlled charging power level in the secondary charge is set in the fully-charged state almost at the end time of the midnight power time zone. The ECU 1 controls the charger 8 to perform a primary charge to the battery 2 at the predetermined charging power level in a period of time from the charging start target time to the first charging end target time, to perform a secondary charge to the battery 2 at the controlled charging power level after the first charging end target time, to set the battery 2 in the fully-charged state almost at the end time of the midnight power time zone and to end the charge when the battery 2 is set in the fully-charged state or the end time of the midnight power time zone actually comes. The fully-charged battery non-use period can be set to be shorter than the predetermined threshold of the non-use period.

Therefore, because the ECU 2 controls the charger 8 to perform the primary charge at the predetermined charging power level, the battery 2 can be set in a practically useful charging state at the first charging end target time. Accordingly, even when the user is unexpectedly required to run the vehicle at midnight, the user can reliably run the vehicle. Further, because of the controlled charging power level and the shortened fully-charged battery non-use period, the life of the battery 2 can be lengthened. Moreover, because the primary charge and the secondary charge are performed in the midnight power time zone, an electric rate in the charge can be reduced.

Examples of the charge to the secondary battery 2 in various mode setting cases will be described with reference to FIG. 2 to FIG. 6. FIG. 2 shows a first example of a change in the state of charge in the secondary battery 2 in a period of time from a motor driving stop time to a motor driving start time.

In the example shown in FIG. 2, none of the midnight power mode and the life lengthening mode is set (i.e., the switches 31 and 32 are set in the off state together). The electric power of the battery 2 is gradually reduced during the driving of the motor 3. In this example, when the user stops driving the motor 3 and inserts the plug 16 into a socket outlet of the off-board power source, the ECU 1 immediately starts a charge to the battery 2 at the maximum charging power level allowed for the charger 8. For example, the charge is started at the charging start time closed to and earlier than the start time of the midnight power time zone. Therefore, the state of charge in the battery 2 is rapidly increased, and the battery 2 is set in the fully-charged state at a middle time of the midnight power time zone. Then, the charge is completed, and the battery 2 set in the fully-charged state is left as it is until the driving of the motor 3 is started.

When the user operates the switch 7 to start driving the motor 3, for example, at 8 o'clock in the morning, the microcomputer 21 stores this motor driving start time in the memory 27 as a record of one motor driving start time. Therefore, when the user repeatedly starts driving the motor 3, the microcomputer 21 can collect a record of motor driving start times and can set the first and second charging end target times by analyzing the record in the learning operation.

FIG. 3 shows a second example of a change in the state of charge in the secondary battery 2 in a period of time from a motor driving stop time to a motor driving start time.

In the example shown in FIG. 3, both the midnight power mode and the life lengthening mode are set (i.e., the switches 31 and 32 are set in the on state together). Further, no first charging end target time is set. The user inserts the plug 16 into a socket outlet of the off-board power source before the start time of the midnight power time zone. Because the midnight power mode is set, the ECU 1 does not immediately start a charge to the battery 2 but controls the charger 8 to start a charge to the battery 2 at the start time of the midnight power time zone. Further, because the life lengthening mode is set, the charging power level in this charge is controlled. That is, the ECU 1 calculates a controlled charging power level (i.e., a charging schedule) at the start time of the midnight power time zone such that the secondary battery 2 constantly charged at the controlled charging power level is almost set in the fully-charged state almost at the end time of the midnight power time zone. Then, the ECU 1 controls the charger 8 to charge the battery 2 at the controlled charging power level in the midnight power time zone. When the end time of the midnight power time zone comes or the battery 2 is set in the fully-charged state before the end time of the midnight power time zone, the ECU 1 stops this charge.

Therefore, the charge to the battery 2 is started at the start time of the midnight power time zone, the state of charge in the battery 2 is gradually increased, and the battery 2 is set in the fully-charged state almost at the end time of the midnight power time zone.

Accordingly, because the charge is performed only in the midnight power time zone, the ECU 1 can reduce an electric rate in the charge.

Further, because the user usually starts driving the motor 3 at a motor driving start time close to and later than the end time of the midnight power time zone, the ECU 1 can shorten a period of time in which the battery 2 set in the fully-charged state is left as it is. Accordingly, the ECU 1 can lengthen the life of the battery 2.

Moreover, when the user repeatedly starts driving the motor 3, the ECU 1 can collect a record of motor driving start times and can set the second charging end target time by analyzing the record in the learning operation.

FIG. 4 shows a third example of a change in the state of charge in the secondary battery 2 in a period of time from a motor driving stop time to a motor driving start time. In the example shown in FIG. 4, only the midnight power mode is set while the life lengthening mode is not set (i.e., the switch 31 is set in the on state while the switch 32 is set in the off state).

The user inserts the plug 16 into a socket outlet of the off-board power source before the start time of the midnight power time zone. Because the midnight power mode is set, the ECU 1 does not immediately start a charge to the battery 2, but controls the charger 8 to start a charge to the battery 2 at the start time of the midnight power time zone. Because the life lengthening mode is not set, the ECU 1 performs this charge at the maximum charging power level allowed for the charger 8 and continues this charge until the battery 2 is set in the fully-charged state. When the battery 2 is set in the fully-charged state, the charge is completed.

Therefore, the state of charge in the battery 2 is rapidly increased, and the battery 2 is set in the fully-charged state in the middle of the midnight power time zone. Further, until the user starts driving the motor 3, the battery 2 set in the fully-charged state is left as it is.

Accordingly, because the charge is performed only in the midnight power time zone, the ECU 1 can reduce an electric rate in the charge.

Further, although the fully-charged battery non-use period of time is longer than that in the second example, this period can be shorter than that in the first example because the charge starts at the start time of the midnight power time zone.

Moreover, when the user repeatedly starts driving the motor 3, the ECU 1 can collect a record of motor driving start times and can set the second charging end target time by analyzing the record in the learning operation.

FIG. 5 shows a fourth example of a change in the state of charge in the secondary battery 2 in a period of time from a motor driving stop time to a motor driving start time. In the example shown in FIG. 5, only the life lengthening mode is set while the midnight power mode is not set (i.e., the switch 31 is set in the of f state while the switch 32 is set in the on state). Further, although the second charging end target time is set, but no first charging end target time is set.

When the user inserts the plug 16 into a socket outlet of the off-board power source before the start time of the midnight power time zone, the ECU 1 controls the charger 8 to immediately start a charge to the battery 2. Because the midnight power mode is not set, this charge is performed regardless of the midnight power time zone. Further, because the life lengthening mode is set, the ECU 1 calculates a controlled charging power level such that the battery 2 is set in the fully-charged state almost at the second charging end target time, and controls the charger 8 to perform the charge at the controlled charging power level. Then, when the second charging end target time comes or the battery 2 is actually set in the fully-charged state before the second charging end target time, the ECU 1 stops this charge.

Accordingly, because the charge is performed at the controlled charging power level under control of the ECU 1, the ECU 1 can lengthen the life of the battery 2. Further, because the second charging end target time is set so as to be close to the motor driving start times collected in the learning operation, the ECU 1 can shorten a period of time in which the battery 2 set in the fully-charged state is left as it is. Accordingly, the ECU 1 can further lengthen the life of the battery 2.

Figure 6:
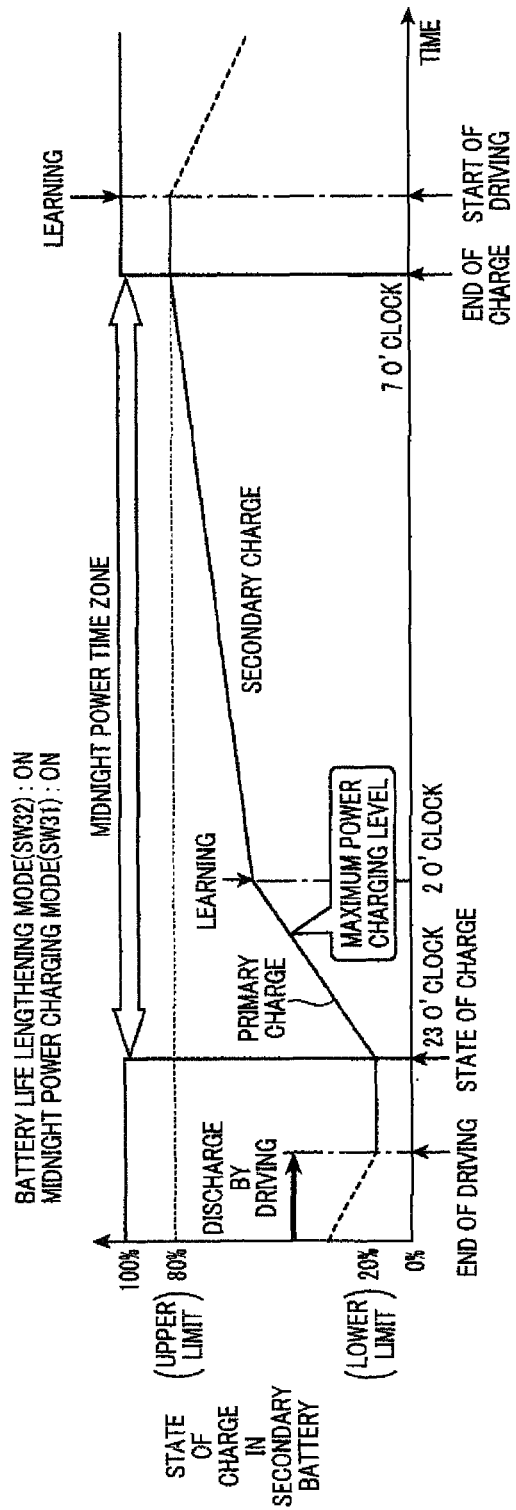
FIG. 6 shows a change in the state of charge in a secondary battery according to both a midnight power charging mode and a battery life lengthening mode.

FIG. 6 shows a fifth example of a change in the state of charge in the secondary battery 2 in a period of time from a motor driving stop time to a motor driving start time. In the example shown in FIG. 6, both the midnight power mode and the life lengthening mode are set (i.e., the switches 31 and 32 are set in the on state together). Further, the first charging end target time is set.

The user inserts the plug 16 into a socket outlet of the off-board power source before the start time of the midnight power time zone. Because the midnight power mode is set, the ECU 1 does not immediately start a charge to the battery 2, but starts a primary charge to the battery 2 at the start time of the midnight power time zone. Because the first charging end target time placed in the midnight power time zone is set, the ECU 1 performs this primary charge at the maximum charging power level until the first charging end target time. When the first charging end target time comes, the ECU 1 stops the primary charge and starts a secondary charge to the battery 2 at the first charging end target time. Because the life lengthening mode is set, the ECU 1 calculates a controlled charging power level such that the battery 2 charged at the controlled charging power level is set in the fully-charged state almost at the end time of the midnight power time zone, and controls the charger 8 to perform the secondary charge at the controlled charging power level. Then, when the battery 2 is actually set in the fully-charged state before the end time of the midnight power time zone or the end time of the midnight power time zone comes, the ECU 1 stops this secondary charge.

Therefore, because the state of charge in the battery 2 is rapidly increased until the first charging end target time, the battery 2 can be set in a practically useful charging state at the first charging end target time. Accordingly, even when the user is unexpectedly required to run the vehicle at midnight, the user can reliably run the vehicle.

Further, the state of charge in the battery 2 is gradually increased in a period of time started at the first charging end target time and ended at the end time of the midnight power time zone. In addition, because the user usually starts the driving of the motor 3 at a motor driving start time close to and later than the end time of the midnight power time zone, the ECU 1 shortens a period of time in which the battery 2 set in the fully-charged state is left as it is. Accordingly, the ECU 1 can lengthen the life of the battery 2

Moreover, the ECU 1 controls the charger 8 to perform the primary charge and the secondary charge only in the midnight power time zone. Accordingly, the ECU 1 can reduce an electric rate in the charge.

Furthermore, when the user repeatedly starts driving the motor 3, the ECU 1 collects a record of motor driving start times in the morning and sets the second charging end target time by analyzing the record in the learning operation. Further, the ECU 1 collects a record of motor driving start times at midnight and sets the first charging end target time by analyzing the record in the learning operation.

Figure 7:
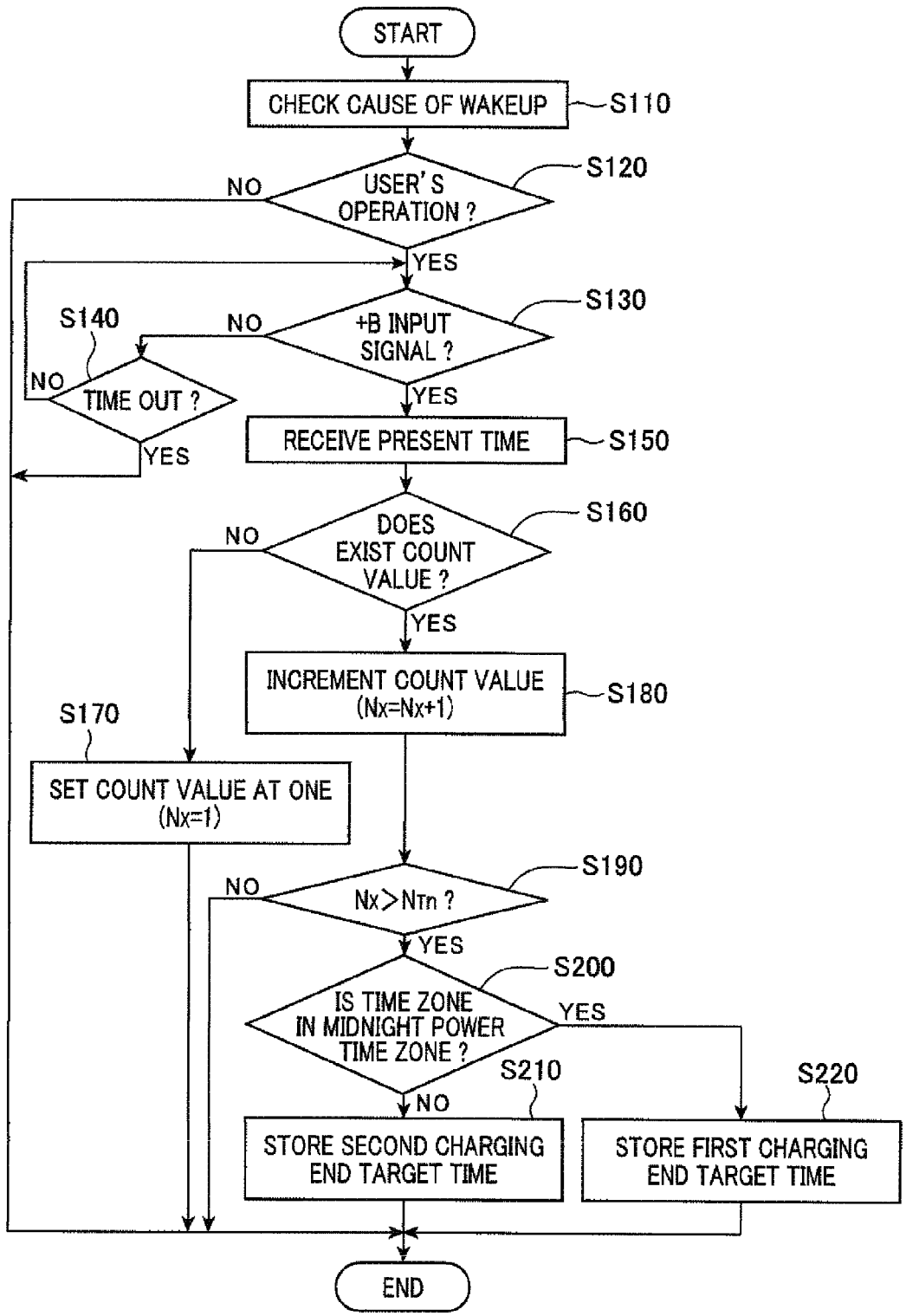
FIG. 7 is a flow chart showing the process for setting first and second charging end target times.

Next, the setting of the first and second charging end target times in the microcomputer 21 will be described with reference to FIG. 7. FIG. 7 is a flow chart showing the process for setting the first and second charging end target times.

As shown in FIG. 7, at step S110, when the microcomputer 21 set in the sleep mode is woken up to start its operation, the microcomputer 21 checks the cause of the wakeup. At step S120, the microcomputer 21 judges whether or not the cause of the wakeup is user's operation for the switch 7. When the microcomputer 21 was not woken up by user's operation for the switch 7 (NO at step S120), this process is ended. In contrast, when user's operation for the switch 7 caused the wakeup of the microcomputer 21 (YES at step S120), the microcomputer 21 judges at step S130 whether or not a +B input signal transmitted from the detecting unit 28 is received in the microcomputer 21. In other words, the microcomputer 21 judges at step S130 whether or not the ECU 1 is set in the IGON state by user's operation for the switch 7. When no +B input signal is received in the microcomputer 21 (NO at step S130), at step S140, the microcomputer 21 performs a time out judgment. When no reception of the +B input signal is continued for a predetermined period of time (YES at step S140), the microcomputer 21 finally judges that no IGON state is set in the ECU 1, and this process is ended.

In contrast, when the microcomputer 21 receives a +B input signal from the detecting unit 28 (NO at step S140, YES at step S130), the microcomputer 21 judges that the battery voltage is applied to the motor ECU 4 through the main relay 12 in response to user's operation for the switch 7 to start driving the motor 3. Therefore, at step S150, the microcomputer 21 receives the present time from the RTC 26 as a motor driving start time.

Then, at step S160, the microcomputer 21 determines a time zone including this motor driving start time, and the microcomputer 21 judges whether or not a count value Nx indicating the number of motor driving start times included in this determined time zone exists in the memory 27. The microcomputer 21 sets a plurality of time zones by equally dividing twenty-four hours of one day. Each time zone is set at a time length of thirty minutes. For example, when a motor driving start time is 7:38 a.m., this start time belongs to the time zone from 7:30 a.m. to 8:00 a.m. Therefore, the microcomputer 21 can store a count value corresponding to each time zone in the memory 27.

When no count value corresponding to the determined time zone exist in the memory 27 (NO at step S160), the microcomputer 21 judges that this is the first time that the microcomputer 21 detects a motor driving start time of the determined time zone. Therefore, at step S170, the count value Nx corresponding to the determined time zone is set at one and is stored in the memory 27, and this process is ended.

In contrast, when the count value Nx corresponding to the determined time zone has been already stored in the memory 27 (YES at step S160), the microcomputer 21 judges that the microcomputer 21 detected at least one motor driving start time of the determined time zone in the past. Therefore, at step S180, the count value Nx is incremented by one. Then, at step S190, the microcomputer 21 judges whether or not the incremented count value Nx is higher than a threshold Nth (e.g., three, four or five) of high frequency.

When the count value Nx is not higher than the threshold (NO at step S190), the microcomputer 21 judges that the frequency of motor driving start times belonging to the determined time zone is not sufficiently high. Therefore, this process is ended. In contrast, when the count value Nx is higher than the threshold (YES at step S190), the microcomputer 21 judges that the frequency of motor driving start times belonging to the determined time zone is sufficiently high to set a charging end target time corresponding to the determined time zone. Therefore, the microcomputer 21 sets a charging end target time corresponding to the determined time zone.

More specifically, at step S200, the microcomputer 21 judges whether or not the determined time zone is placed in the midnight power time zone. When the determined time zone is not placed in the midnight power time zone (NO at step S200) at step S210, the microcomputer 21 stores the middle time of the determined time zone in the memory 27 as a second charging end target time. For example, when the determined time zone is from 7:30 a.m. to 8:00 a.m., 7:45 a.m. is set as a second charging end target time. In contrast, when the determined time zone is placed in the midnight power time zone (YES at step S200), at step S220, the microcomputer 21 stores the middle time of the determined time zone in the memory 27 as a first charging end target time.

As described above, each time the user starts driving the motor 3 while setting the ECU 1 in the IGON state, the microcomputer 21 determines the time zone corresponding to the motor driving start time at which the user actually starts the driving of the motor 3 to go out by running the vehicle. Therefore, the microcomputer 21 can perform the learning operation to calculate the frequency of motor driving start times for each time zone and to set the first or second charging end target time corresponding to a high frequency of motor driving start times. Accordingly, the microcomputer 21 can reliably set the first and second charging end target times.

In this embodiment, when the microcomputer 21 receives one +B input signal from the detecting unit 28, the microcomputer 21 performs the learning operation to set the first and second charging end target times. However, the microcomputer 21 may perform this learning operation when recognizing or determining the IGON state set in the ECU 1 from an operation signal transmitted from the switch 7, or the microcomputer 21 may perform this learning operation in response to both the reception of one +B input signal and the recognition or determination of the ICON state from the operation signal.

Further, when count values Nx corresponding to a plurality of determined time zones placed in the midnight power time zone are higher than the threshold, the first charging end target time may be set based on the determined time zone corresponding to the highest count value. Further, when the time zone corresponding to the highest count value is changed to another time zone, the first charging end target time may be renewed so as to correspond to the highest count value newly set. In the same manner, the second charging end target time may be set and renewed.

These first and second charging end target times set in the process shown in FIG. 7 are appropriately used for the process for controlling the charge to the battery 2 in the microcomputer 21.

Figure 8:
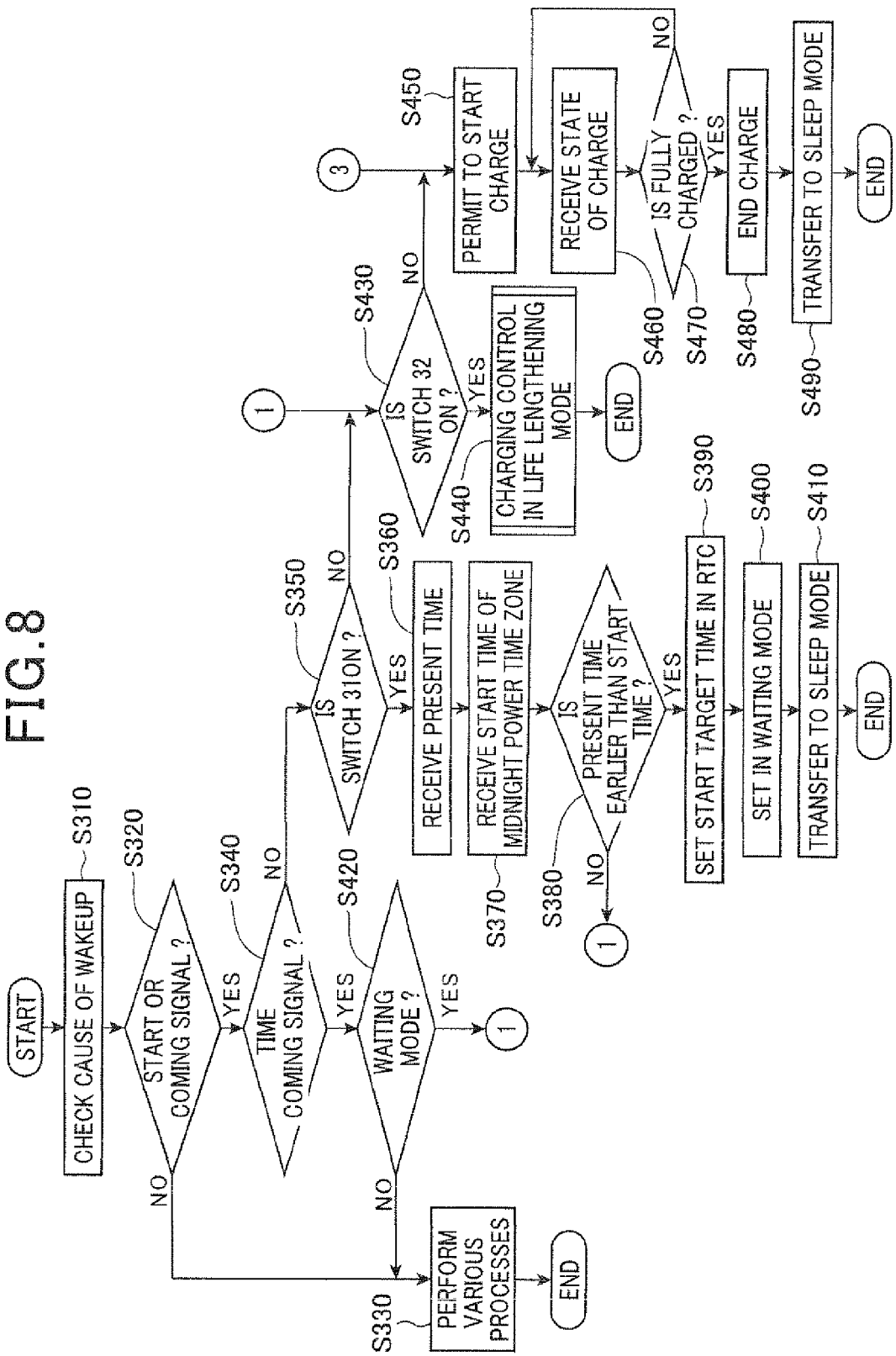
FIG. 8 is a flow chart showing the process for controlling the charge to a secondary battery.

Next, the process for controlling the charge to the battery 2 in the microcomputer 21 by setting a charging schedule of the battery 2 will be described with reference to FIG. 8. FIG. 8 is a flow chart showing the process for controlling the charge to the battery 2.

As shown in FIG. 8, at step S310, when the microcomputer 21 is woken up, the microcomputer 21 checks the cause of the wakeup. At step S320, the microcomputer 21 judges whether the cause of the wakeup is the reception of a charging start signal S1 transmitted from the charger 8 or the reception of a setting time coming signal transmitted from the RTC 26. When the microcomputer 21 is not woken up by the reception of any charging start signal S1 or any setting time coming signal (NO at step S320), at step S330, the microcomputer 21 performs various processes corresponding to the cause for the wakeup. Then, the charging control process is ended.

In contrast, when the microcomputer 21 is woken up by the reception of a charging start signal S1 or a setting time coming signal (YES at step S320), at step S340, the microcomputer 21 judges whether or not the cause for the wakeup is the reception of a setting time coming signal transmitted from the RTC 26.

When the microcomputer 21 is woken up by the reception of a charging start signal S1 (NO at step S340), the microcomputer 21 judges whether or not at least one of the charging modes is set by the user for the charge to the battery 2. More specifically, at step S350, the microcomputer 21 judges whether or not the switch 31 is set in the on state to set the ECU 1 in the midnight power mode. When the switch 31 is set in the on state (NO at step S350), the procedure proceeds to step S430.

In contrast, when the switch 31 is set in the on state (YES at step S350), the microcomputer 21 realizes that the ECU 1 is set in the midnight power mode. Therefore, at step S360, the microcomputer 21 receives the present time from the RTC 26. Then, at step S370, the microcomputer 21 receives the start time (e.g., 23 o'clock) of the midnight power time zone from the memory 27 as a charging start target time. Then, at step S380, the microcomputer 21 compares the received present time and the charging start target time and judges whether or not the present time is earlier than the charging start target time (i.e., the start time). When the present time is coincident with or later than the charging start target time (NO at step S380), it is now in the midnight power time zone, so that the charging to the battery 2 may be immediately started. Therefore, the procedure proceeds to step S430.

In contrast, when the present time is earlier than the charging start target time (YES at step S380), the charging should wait until the charging start target time comes. Therefore, at step S390, the microcomputer 21 sets the charging start target time in the RTC 26 as a setting time. Then, at step S400, the microcomputer 21 is set in a charging start waiting mode to start charging the battery 2 when the setting time actually comes. Then, at step S410, the wakeup mode set in the microcomputer 21 is transferred to the sleep mode, and this process is ended. Therefore, until the charging start target time comes, the process from step S310 to S330 is performed at predetermined intervals.

When the charging start target time comes, the microcomputer 21 set in the sleep mode is woken up in response to the reception of a setting time coming signal transmitted from the RTC 26, the cause of the wakeup is checked at step 9310, and the procedure proceeds to step S320 and step S340. When the microcomputer 21 is woken up by the reception of the setting time coming signal (YES at step S340), at step S420, the microcomputer 21 judges whether or not the microcomputer 21 is set in the charging start waiting mode. When the microcomputer 21 woken up due to the reception of a signal transmitted from the RTC 26 is not set in the charging start waiting mode (NO at step S420), at step S330, the microcomputer 21 performs various processes corresponding to the cause for the wakeup. Then, the charging control process is ended. In contrast, when the microcomputer 21 is set in the charging start waiting mode at step S400 (YES at step S420), the procedure proceeds to step S430.

At step S430, the microcomputer 21 judges whether or not the switch 32 is set in the on state to set the ECU 1 in the life lengthening mode. When the switch 32 is set in the on state (YES at step S430), the microcomputer 21 realizes that the ECU 1 is set in both the midnight power mode and the life lengthening mode when step S430 is executed in response to the negative judgment at step S380 or the affirmative judgment at S420. In contrast, when step S430 is executed in response to the negative judgment at step S350, the microcomputer 21 realizes that the ECU 1 is set only in the life lengthening mode. Therefore, at step S440, the microcomputer 21 performs the charging control according to the life lengthening mode while considering the midnight power mode if necessary, and this process is ended.

Figure 9:
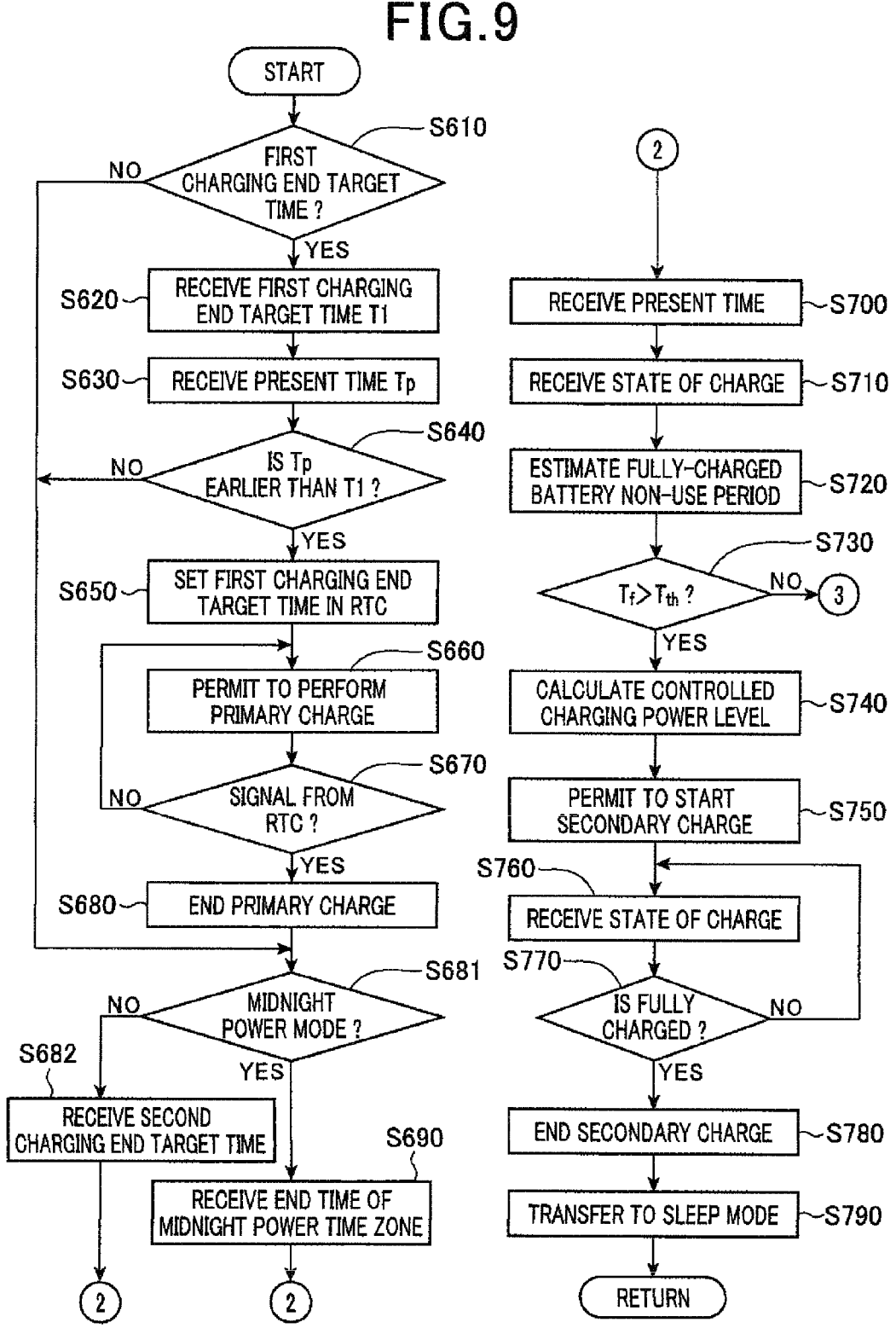
FIG. 9 is a flow chart showing the control of a charge to a secondary battery according to a battery life lengthening mode.

FIG. 9 is a flow chart showing the charging control according to the life lengthening mode. As shown in FIG. 9, at step S610, the microcomputer 21 judges whether or not information on a first charging end target time exists in the memory 27. When this information does not exist in the memory 27 (NO at step S610), the procedure proceeds to step S681.

In contrast, when this information exists in the memory 27 (YES at step S610), at step S620, the microcomputer 21 receives the first charging end target time T1 from the memory 27. Then, at step S630, the microcomputer 21 receives the present time Tp from the RTC 26. Then, at step S640, the microcomputer 21 judges whether or not the present time Tp is earlier than the first charging end target time T1.

When the present time Tp is not earlier than the first charging end target time T1 (NO at step S640), the ECU 1 performs no primary charge to the battery 2. Therefore, the procedure proceeds to step S681 to perform a secondary charge to the battery 2. In contrast, when the present time Tp is earlier than the first charging end target time T1 (YES at step S640), the ECU 1 performs a primary charge to the secondary battery 2. Therefore, at step S650, the microcomputer 21 sets the first charging end target time in the RTC 26. Then, at step S660, the microcomputer 21 permits the charging control microcomputer 23 to perform a primary charge to the battery 2 at the present time.

More specifically, this present time is not earlier than the start time of the midnight power time zone when the negative judgment at step S380 or the affirmative judgment at S420 is obtained. In contrast, when the negative judgment at step S350 is obtained, this present time is coincident with the time at which the microcomputer 21 receives the charging start signal S1 from the charger 8. The microcomputer 21 transmits a charging request signal, indicating permission of the primary charge at the maximum charging power level, to the microcomputer 23. In response to the charging request signal, the microcomputer 23 outputs a charging control signal S2, indicating the primary charge at the maximum charging power level, to the charger 8, and the charger 8 performs the primary charge at the present time to charge electric power to the battery 2. When step S660 is executed at the first time in this charging control, the charger 8 starts the primary charge at the present time.

Then, at step S670, the microcomputer 21 judges whether or not the RTC 26 outputs a setting time coming signal, indicating that the first charging end target time comes, to the microcomputer 21. When the microcomputer does not receive this signal from the RTC 26 (NO at step S670), the procedure returns to step S660. Therefore, the step S660 and step S670 are repeatedly executed at predetermined interval of time, and the primary charge is continued until the first charging end target time actually comes. When the first charging end target time actually comes, the microcomputer 21 receives the setting time coming signal from the RTC 26 (YES at step S670). Then, at step S680, the microcomputer 21 performs the process for ending the primary charge. That is, the microcomputer 23 outputs a charging control signal S2, indicating the stoppage of the primary charge, to the charger 8. Then, the procedure proceeds to step S681.

At step S681, the microcomputer 21 judges whether or not the ECU 1 is set in the midnight power mode. When the ECU 1 is not set in the midnight power mode (NO at step S350), the microcomputer 21 recognizes that the ECU 1 is set only in the life lengthening mode. Therefore, at step S682, the microcomputer 21 receives the second charging end target time, set in the learning operation, from the memory 27 to control a secondary charge to the battery 2 based on the second charging end target time. Then, the procedure proceeds to step S700. In contrast, when the ECU 1 is set in the midnight power mode (YES at step S681), the microcomputer 21 recognizes that the ECU 1 is set in both the midnight power mode and the life lengthening mode. Therefore, at step S690, the microcomputer 21 receives the end time of the midnight power time zone from the memory 27 as a second charging end target time. Then, the procedure proceeds to step S700.

At step S700, the microcomputer 21 receives the present time from the RTC 26. Then, at step S710, the microcomputer 21 receives the state of charge in the battery 2 from the microcomputer 22. Then, at step S720, on the assumption that a secondary charge to the battery 2 is performed at the maximum charging power level, the microcomputer 21 estimates a fully-charged battery non-use period of time Tf from the maximum charging power level and the state of charge in the battery 2. The fully-charged battery non-use period Tf denotes a period of time in which the battery set in the fully-charged state is left as it is without being used. Then, at step S730, the microcomputer 21 judges whether or not the fully-charged battery non-use period Tf exceeds a predetermined threshold Tth of the non-use period.

When the fully-charged battery non-use period Tf does not exceed the threshold Tth (NO at step S730), the life time of the battery 2 can be lengthened even when the battery 2 is charged at the maximum charging power level to be fully charged at a charged time earlier than the second charging end target time. Therefore, the procedure proceeds to step S450 (see FIG. 8) to charge the battery 2 at the maximum charging power level in the secondary charge. In contrast, when the fully-charged battery non-use period Tf exceeds the threshold Tth (NO at step S730), the life time of the battery 2 is sometimes shortened when the battery 2 is charged at the maximum charging power level. Therefore, at step S740, the microcomputer 21 calculates a controlled charging power level of a controlled charging schedule such that the battery 2 is fully charged at the second charging end target time when being charged at the controlled charging power level.

Then, at step S750, the microcomputer 21 permits the microcomputer 23 to start a secondary charge to the battery 2. More specifically, the microcomputer 21 sends a charge request, indicating the permission of the secondary charge at the controlled charging power level, to the microcomputer 23. In response to this request, the microcomputer 23 outputs a charging control signal S2, indicating the secondary charge at the controlled charging power level, to the charger 8, and the charger 8 starts the secondary charge to the battery 2 at the controlled charging power level.

After the start of the secondary charge, at step S760, the microcomputer 21 receives the state of charge in the battery 2 from the microcomputer 22. Then, at step S770, the microcomputer 21 judges, based on the received state of charge, whether or not the battery 2 is fully charged. When the battery 2 is not set in the fully-charged state (NO at step S770), the procedure returns to step S760. Therefore, until the battery 2 is fully charged, the secondary charge to the battery 2 is continued. When the battery 2 is set in the fully-charged state (YES at step S770), at step S780, the microcomputer 21 performs the process for ending the secondary charge. In this process, the microcomputer 21 instructs the microcomputer 23 to stop the secondary charge. Therefore, the microcomputer 23 controls the charger 8 to stop the secondary charge, and the charger 8 stops the secondary charge. Then, at step S790, the wakeup mode set in the microcomputer 21 is transferred to the sleep mode, and this control is ended.

Returning to FIG. 8, when the switch 32 is not set in the off state (NO at step S430), the microcomputer 21 recognizes that the ECU 1 is not set in the life lengthening mode. Therefore, the procedure proceeds to step S450 to perform a charge to the battery 2 at the maximum charging power level, regardless of the setting of the midnight power mode.

At step S450, the microcomputer 21 permits the microcomputer 23 to start a charge to the battery 2 at the present time. More specifically, the microcomputer 21 sends a charge request, indicating the permission of a charge at the maximum charging power level, to the microcomputer 23. In response to this request, the microcomputer 23 outputs a charging control signal S2, indicating a charge at the maximum charging power level, to the charger 8, and the charger 8 starts a charge to the battery 2 at the maximum charging power level at the present time. When no charging mode is set, this present time is coincident with the reception time of the charging start signal S1 in the microcomputer 21. In contrast, when only the midnight power mode is set, this present time is not earlier than the start time of the midnight power time zone.

After the start of this charge, at step S460, the microcomputer 21 receives the state of charge in the battery 2 from the microcomputer 22. Then, at step S470, the microcomputer 21 judges, based on the received state of charge, whether or not the battery 2 charged at the maximum charging power level is fully charged. When the battery 2 has not yet set in the fully-charged state (NO at step S470), the procedure returns to step S460. Therefore, until the battery 2 is set in the fully-charged state, the charge to the battery 2 at the maximum charging power level is continued. When the battery 2 is set in the fully-charged state (YES at step S470), at step S480, the microcomputer 21 performs the process for ending the charge to the battery 2. In this process, the microcomputer 21 instructs the microcomputer 23 to stop the charge. Therefore, the microcomputer 23 controls the charger 8 to stop the charge, and the charger 8 stops the charge. Then, at step S490, the wakeup mode set in the microcomputer 21 is transferred to the sleep mode, and this control is ended.

As described above, to lengthen the life of the second battery 2, the sub-control microcomputer 21 has:

a charging start signal S1 receiving section that receives the charging start signal S1 outputted from the charger 8, an operation signal receiving section that receives an operation signal from the switch 7 as a signal indicating an IGON state of the ECU 1, a charging end target time setting section that receives the present time from the RTC 27 as a motor driving start time, each time the operation signal indicating the IGON state is received, prepares a frequency of motor driving start times for each of time zones of a day, and determines a charging end target time from the time zone corresponding to a high frequency, and a charging control section that receives the present time from the RTC 26 as a charging start target time in response to the reception of the charging start signal S1, sets a charging schedule such that a charge to the secondary battery 2 according to the charging schedule is started at the charging start target time and sets the battery 2 in the fully-charged state, denoting the maximum charging rate, in a charging end target time zone including the charging end target time, produces a charging control signal S2 indicating the charging schedule while referring to the present time indicated by the RTC 26, and outputs the charging control signal S2 to the charger 8 to control the charger 8. According to the charging schedule, the charger 8 starts a charge to the secondary battery at the charging start target time, sets the secondary battery 2 in the fully-charged state, and ends the charge in the charging end target time zone.

Because the charging end target time is determined from the time zone corresponding to a high frequency of motor driving start times, there is a high probability that the user starts the driving of the motor 3 at a driving start time close to the charging end target time on other days. Therefore, a period of time from the fully-charged time, at which the secondary battery 2 is set in the fully-charged state, to the motor driving start time, at which the driving of the motor 3 is actually started, can be shortened.

Accordingly, the ECU 1 can control the charge to the secondary battery 2 with off-board electricity while appropriately performing the charge according to the use of the vehicle and lengthening the life of the battery 2.

Especially, the charging end target time setting section of the microcomputer 21 obtains the present time from the RTC 26 as an operation time in response to the reception of the operation signal indicating the IGON state each time the operation signal is received, calculates a frequency of the operation times for each operation time zone of a day, and sets a representative time of the operation time zone corresponding to the high frequency as the charging end target time.

Therefore, there is a high probability that the user starts driving the vehicle at a driving start time close to the charging end target time every day. In other words, a period of time from the end of a charge to the secondary battery 2 to the start of the driving of the vehicle at the next time can be shortened. Accordingly, a period of time, in which the battery 2 fully charged is left as it is without discharging electric power, can be shortened, and the life of the battery 2 can be effectively lengthened.

Especially, the microcomputer 21 has a second charging mode setting section that sets the life lengthening mode in response to a charging mode setting signal transmitted from the switch 32, and the charging control section of the microcomputer 21 sets a charging schedule, when the second charging mode setting section sets the life lengthening mode, such that the charge to the secondary battery 2 is started at the present time, and outputs the charging control signal S2 to the charger 8 such that the charger 8 performs the charge to the secondary battery 2 according to the charging schedule.

Therefore, the user can set the ECU 1 in the life lengthening mode, if necessary. Accordingly, the ECU 1 can reliably lengthen the life of the battery 2 while increasing the convenience for the user.

Especially, the charging control section of the microcomputer 21 sets the charging schedule such that a charging power level of the charge to the secondary battery is changed during the charge.

For example, the secondary battery is charged at a high charging power level from the charging start target time to a charging middle time, and the secondary battery is charged at a low charging power level from the charging middle time to the charging end target time. Therefore, even when the user is suddenly required to use the vehicle before the charging end target time, the battery 2 of the vehicle has been already charged at the high charging power level at a high probability. Accordingly, the user can reliably run the vehicle for a long distance.

Especially, the ECU 1 has a relay driving unit, embodied by the microcomputer 21 and the IC 24, that turns on the relay 40 in response to the reception of the charging start signal S1 in the microcomputer 21, and a relay signal receiving unit, embodied by the microcomputer 21, that receives a relay signal which is outputted from the relay 40 when the relay 40 is turned on by the relay driving unit 21 and 24. The charging control section of the microcomputer 21 sets the charging schedule in response to one of the reception of the charging start signal S1 in the microcomputer 21 and the reception of the relay signal in the relay signal receiving unit 21 or in response to both the reception of the charging start signal S1 in the microcomputer 21 and the reception of the relay signal in the relay signal receiving unit 21.

Therefore, in response to the reception of the charging start signal S1 in the microcomputer 21 and/or the reception of the relay signal in the unit 21, the microcomputer 21 can reliably recognize that the charger 8 is set so as to charge off-board electricity to the battery 2. Accordingly, the microcomputer 21 can reliably output the charging control signal S2 to the charger 8.

Especially, the ECU 1 has a relay driving unit, embodied by the microcomputer 21, the detecting unit 38 and the OR circuit 39, that turns on the relay 12 in response to the reception of the operation signal indicating the IGON state in the microcomputer 21, and a relay signal receiving unit, embodied by the detecting unit 28, that receives a relay signal which is outputted from the relay 12 when the relay 12 is turned on by the relay driving unit. The charging end target time setting section of the microcomputer 21 sets the charging end target time in response to one of the reception of the operation signal in the microcomputer 21 and the reception of the relay signal in the relay signal receiving unit 21 or in response to both the reception of the operation signal in the microcomputer 21 and the reception of the relay signal in the relay signal receiving unit 21.

Therefore, in response to the reception of the operation signal in the microcomputer 21 and/or the reception of the relay signal in the unit 21, the microcomputer 21 can reliably recognize that the user operates the switch 7 to output the operation signal. Accordingly, the charging end target time can be reliably set.

Especially, the operation signal receiving section of the microcomputer 21 can receive each of a plurality of operation signals indicating respective operation states of the vehicle, the microcomputer 21 and the RTC 26 receive electric power from the battery 45 of the vehicle to be activated at any time, regardless of the operation states, the microcomputer 21 is set in a sleep mode in response to satisfaction of a sleep condition in the vehicle so as to stop operations of the charging end target time setting section and the charging control section of the microcomputer 21, and the sleep mode in the microcomputer 21 is released in response to the reception of one reception signal in the operation signal receiving section or the reception of the charging start signal S1 in the charging start signal S1 receiving section so as to start operating the charging end target time setting section and the charging control section of the microcomputer 21.

Therefore, when it is not necessary to wake up the microcomputer 21, the microcomputer 21 is set in the sleep mode so as to reduce the electric power consumed in the microcomputer 21. Accordingly, dark current flowing through the microcomputer 21 can be reduced. Further, when the sleep mode of the microcomputer 21 is released, the ECU 1 allows the supply of electric power to the microcomputers 22 and 23. Accordingly, the ECU 1 having a high practical use can be provided.

Especially, the RTC 26 is a real time clock. As is well known, the real time clock has a high time precision. The ECUs disposed in the vehicle are continuously operated for a long time such as two or five years without stopping electric power supplied to the ECUs. Therefore, assuming that the time precision in the RTC 26 is not so high, the error in time is gradually increased during the continuous operation of the ECUs, and the charging start target time and the charging end target time cannot be set with high precision. However, in this embodiment, because the RTC 26 has a high time precision, the ECU 1 can control the ECUs for a long time.

To reduce an electric rate in the charge to the second battery 2, the sub-control microcomputer 21 has:
the charging start signal S1 receiving section, and
a charging control section that sets a midnight power time zone, sets a charging schedule, in response to the reception of the charging start signal S1, such that a charge to the secondary battery 2 is performed in the midnight power time zone to set the secondary battery 2 in a state of charge denoting a predetermined charging rate, produces a charging control signal S2 indicating the charging schedule while referring to the present time indicated by the RTC 26, and outputs the charging control signal S2 to the charger 8 to control the charger 8. The charger 8 performs a charge to the secondary battery in the midnight power time zone according to the charging schedule to set the secondary battery 2 in the state of charge denoting the predetermined charging rate.

Therefore, when an electric rate in the charge is cheap in the midnight power time zone, the charge to the battery 2 can be automatically performed at a low rate. Accordingly, the ECU 1 can control the charge to the battery 2 with off-board electricity while reducing an electric rate in the charge and inconvenience in charging.

Especially, the microcomputer 21 has a charging mode setting section that sets the midnight power mode in response to a charging mode setting signal transmitted from the switch 31. The charging control section of the microcomputer 21 receives the time signal from the RTC 26 in response to the reception of the charging start signal S1 in the microcomputer 21, sets a midnight power time zone placed at midnight as the specific time zone when the charging mode setting section sets the midnight power mode, sets the charging schedule such that the charge to the secondary battery 2 is started at a start time of the midnight power time zone when this present time of the time signal corresponding to the reception of the charging start signal 81 is earlier than the start time of the midnight power time zone and is started at the present time of the time signal corresponding to the reception of the charging start signal S1 when this present time is coincident with or later than the start time of the midnight power time zone, and outputs the charging control signal S2 to the charger 8 such that the charger performs the charge to the secondary battery 2 according to the charging schedule.

Because an electric rate is cheap in the midnight power time zone, the electric rate for charging the secondary battery 2 can be reduced.

Especially, the microcomputer 21 has a first charging mode setting section that sets the midnight power mode in response to a first charging mode setting signal transmitted from the switch 31 and a second charging mode setting section that sets the life lengthening mode in response to a second charging mode setting signal transmitted from the switch 32. The charging control section of the microcomputer 21 sets the midnight power time zone when the first charging mode setting section sets the midnight power mode, sets the charging schedule, in response to the setting of the modes in the first and second charging mode setting units, such that the secondary battery 2 is set in the fully-charged state at the end time of the midnight power time zone, and outputs the charging control signal S2 indicating the charging schedule to the charger such that the charger ends the charge to the battery 2 at the end time of the midnight power time zone.

Therefore, because the charging schedule is set so as to set the battery 2 in the fully-charged state at the end time of the midnight power time zone, the charging time for the battery 2 in the midnight power time zone can be lengthened most. That is, a charging power level of the charge can be minimized. Accordingly, the ECU 1 can control the charge to the battery 2 while lengthening the life of the battery 2 and reducing inconvenience in charging.

In conclusion, the ECU 1 performs the learning operation to collect a frequency of motor driving start times for each time zone from a record of operations performed by the user for the switch 7 and to set a representative time of the time zone corresponding to the highest frequency as a charging end target time. The ECU 1 determines the charging schedule, including the charging start target time, the charging end target time and the charging power level, according the setting states of the switches 31 and 32. The ECU 1 controls the charger 8 to perform a charge to the battery 2 according to the charging schedule.

Accordingly, the ECU 1 can control a charge to the secondary battery 2, being chargeable with off-board electricity, according to the charging schedule while lengthening the life of the battery 2, appropriately performing the charge according to the actual use of the vehicle, saving the user trouble in the charge, and increasing the convenience for the user.

In this embodiment, the second charging end target time is set by using a frequency of motor driving start times for each time zone. However, the microcomputer 21 may detect the present time as a motor driving start time when the driving of the motor 3 is started at the present time for the first time after the last charge to the battery 2.

Further, in this embodiment, when the user starts driving the motor 3 in the morning, the microcomputer 21 detects a motor driving start time. However, the microcomputer 21 may detect a motor driving start time in the evening when the driving of the motor 3 is started from the place of employment after the battery 2 is charged at the place of employment.

Second Embodiment

Figure 10:
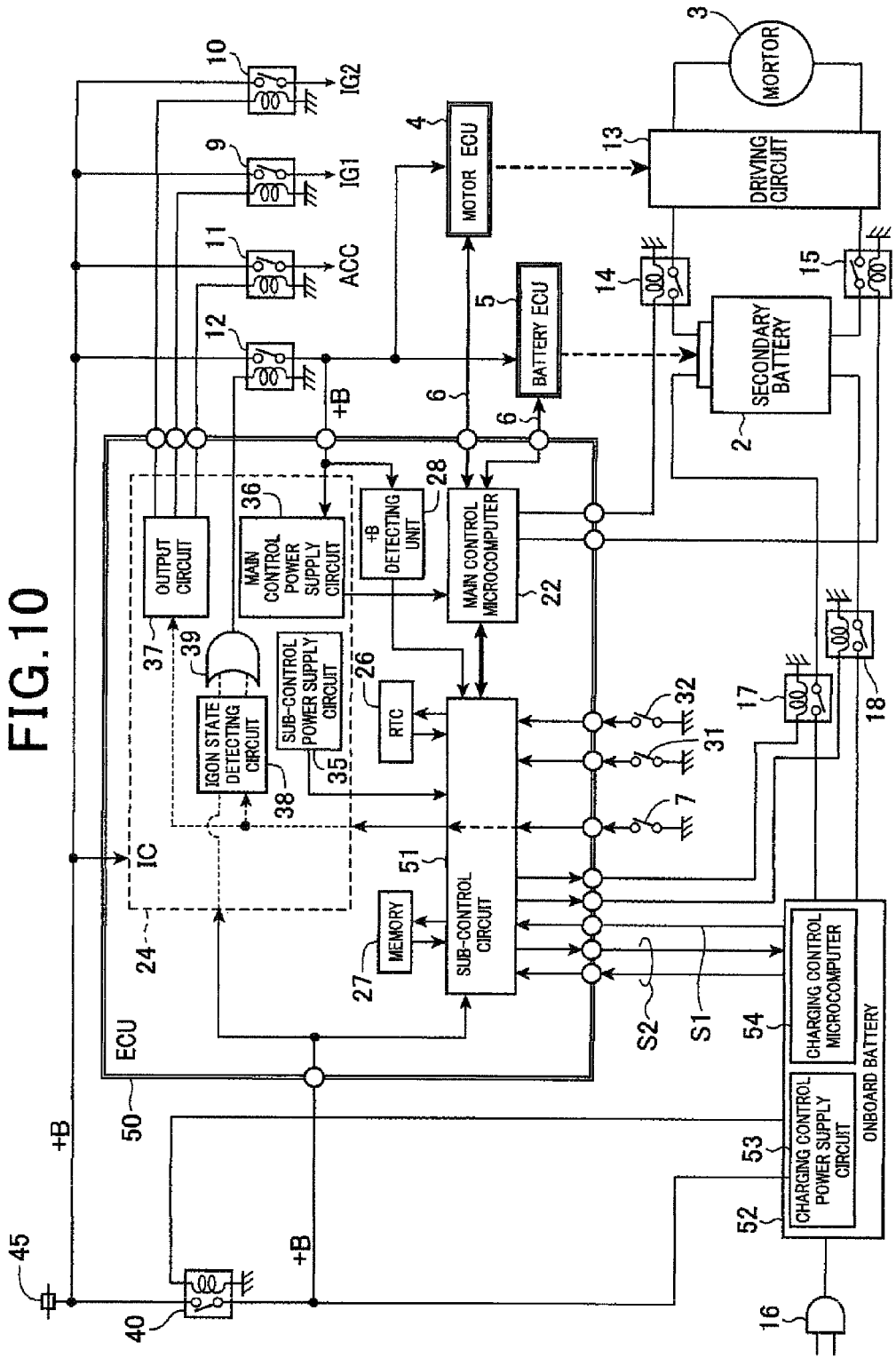
FIG. 10 is a block diagram of an ECU mounted on a vehicle according to the second embodiment of the present invention.

FIG. 10 is a block diagram of an ECU 50 mounted on a vehicle according to the second embodiment. As shown in FIG. 10, the ECU 50 differs from the ECU 1 shown in FIG. 1 in that the ECU 50 has a sub-control microcomputer 51 in place of the microcomputer 21 and is not provided with the circuit 25 or the microcomputer 23. The ECU 50 controls an onboard charger 52 to charge off-board electricity to the secondary battery 2. The charger 52 is provided with a charging control power supply circuit and a charging control microcomputer 54.

The operation of the ECU 50 differing from the operation of the ECU 1 will be described. When the plug 16 of the charger 8 is inserted into a socket outlet of the off-board power source, off-board electricity is supplied to the charger 52, the charger 52 outputs a plug-in relay signal to the relay 40 in addition to a charging start signal S1 outputted to the microcomputer 51. In response to the plug-in relay signal, the relay 40 is turned on, electric power of the battery voltage +B is supplied to the ECU 50 and the circuit 53 through the relay 40, and the operation of the circuit 53 is started. The circuit 53 is operated to supply electric power of a charging control voltage to the microcomputer 54 as a driving power.

Further, in response to the charging start signal S1, the microcomputer 51 set in the sleep mode is woken up, and the microcomputer 51 sets a charging schedule and outputs a charging control signal 32 indicating the charging schedule to the microcomputer 54 of the charger 52. In response to the charging control signal S2, the microcomputer 54 controls the charger 52 to perform a charge to the battery 2 according to the charging schedule.

As described above, in the same manner as the ECU 1, the ECU 50 performs the learning operation to set the charging end target time, and the ECU 50 sets the charging schedule according the setting states of the switches 31 and 32. Further, the ECU 50 transmits the charging schedule to the charger 8. Therefore, the charger 8 performs a charge to the battery 2 according to the charging schedule.

Accordingly, the ECU 50 can control a charge to the secondary battery 2, being chargeable with off-board electricity, according to the charging schedule while lengthening the life of the battery 2, appropriately performing the charge according to the actual use of the vehicle, saving the user trouble in charging, and increasing the convenience for the user.

Third Embodiment

Figure 11:
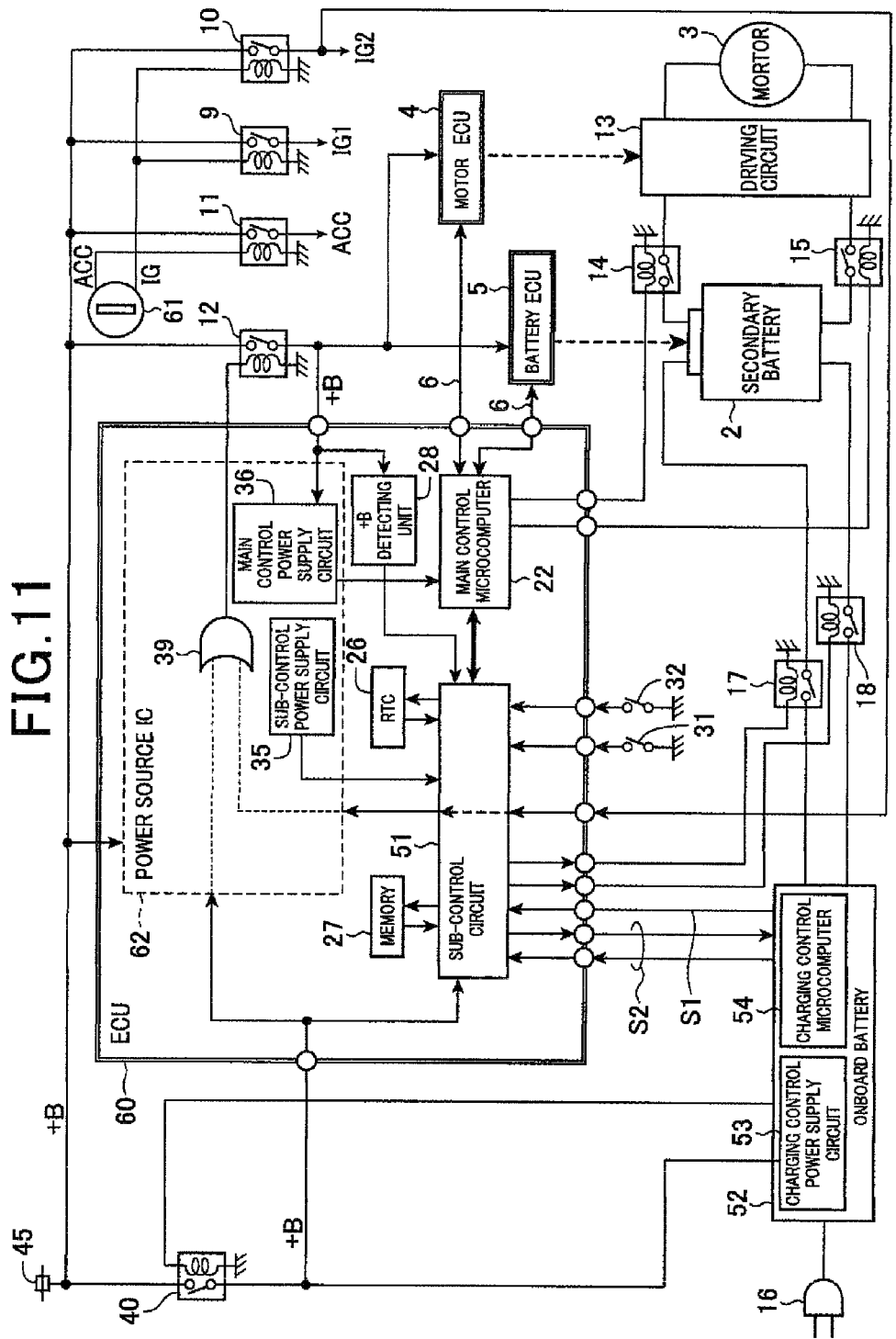
FIG. 11 is a block diagram of an ECU mounted on a vehicle according to the third embodiment of the present invention.

FIG. 11 is a block diagram of an ECU 60 mounted on a vehicle according to the third embodiment. As shown in FIG. 11, the ECU 60 differs from the ECU 50 shown in FIG. 10 in that the ECU 60 has a well-known ignition switch (or a mechanical key) 61 in place of the switch 7, the detecting unit 38 and the circuit 37. The ignition switch 61 has a key receiving inlet. When the user inserts an ignition key into the inlet of the switch 61 and turns the key by one of predetermined angles, the relays 9 to 11 are set in the OFF state, the ACCON state or the IGON state. More specifically, when the key placed at the OFF position is turned to the ACC position, only the ACC relay 11 is turned on while the relays 9 and 10 are maintained to the OFF state together. When the key is turned to the IGON position though the ACC position, the relays 9 and 10 are turned on in addition to the relay 11 turned on. When the key placed at the ACC position or the IGON position is turned back to the OFF position, the relays 9 to 11 are turned off together, and the user can take out the key from the switch 61.

When the second IG relay 10 is turned on, electric power of the battery voltage +B is supplied to the microcomputer 51 of the ECU 60 through the relay 10, in addition to ECUs of the ignition system. In response to the reception of the power, the microcomputer 51 outputs a power receiving signal to the OR circuit 39 of a power source IC 62, the circuit 39 outputs a signal set at the high level to the main relay 12, and the relay 12 is turned on. That is, when the user's key is placed at the IGON position, the relay 12 is set in the on state, and the driving of the motor 3 is started Further, the microcomputer 51 receives the present time from the RTC 26 in response to the reception of the power through the relay 10.

Therefore, each time the microcomputer 51 receives electric power supplied through the relay 10 in response to the turning on of the relay 10, the microcomputer 51 can recognize that the user places the key inserted into the switch 61 at the IGON position to drive the motor 3 at a motor driving start time. That is, the microcomputer 51 performs the learning operation to collect a frequency of motor driving start times for each time zone from a record of operations performed by the user for the switch 61 and to set a charging end target time while referring to the time zone of the high frequency. Then, the microcomputer 51 sets a charging schedule according the setting states of the switches 31 and 32, and the microcomputer 51 controls the charger 8 to perform a charge to the battery 2 according to the charging schedule.

Accordingly, in the same manner as the ECU 50, the ECU 60 can control a charge to the secondary battery 2, being chargeable with off-board electricity, according to the charging schedule while lengthening the life of the battery 2, appropriately performing the charge according to the actual use of the vehicle, saving the user trouble in the charge, and increasing the convenience for the user.

Modifications

These embodiments should not be construed as limiting the present invention to structures of those embodiments, and the structure of this invention may be combined with that based on the prior art. For example, in the first to third embodiments, each time zone has the time length of thirty minutes to collect the frequency of motor driving start times for each time zone. However, each time zone may have a longer time length such as one hour or a shorter time length such as one minute.

Further, in the first to third embodiments, the secondary battery 2 is set in the fully-charged state by one charge or the combination of the primary charge and the secondary charge. However, the battery 2 may be charged by three different charging periods or more while changing the charging power level every charge.

Moreover, in the first to third embodiments, the charging end target time used for each of the primary charge and the secondary charge is set on the basis of a record of motor driving start times. However, the first charging end target time used for the primary charge maybe fixed to end the primary charge at a fixed time of the midnight power time zone.

Furthermore, in the first to third embodiments, the primary charge is performed at the maximum charging power level. However, the primary charge may be performed at a charging power level lower than the maximum charging power level.

Still further, in the first to third embodiments, in the case of the setting of the life lengthening mode, the battery 2 is set in the fully-charged state at the second charging end target time, and the fully-charged state is set at 80% of the maximum charging rate allowed for the battery 2. However, the fully-charged state may be set at a charging rate lower than 80% of the maximum charging rate.

Still further, in the first to third embodiments, each of the ECU 1, the ECU 50 and the ECU 60 is mounted on the plug-in hybrid vehicle. However, the ECUs controlling the charge to the battery 2 according to the embodiments can be used for any vehicle (e.g., an electric vehicle or a fuel battery electric vehicle) having the secondary battery 2 being chargeable with off-board electricity and the motor 3 driven by electric power of the battery 2.

Still further, in the first to third embodiments, the charger 8 or 52 is mechanically connected with the off-board power source to charge off-board electricity to the battery 2. However, the charger 8 or 52 may be electromagnetically connected with the off-board power source without being mechanically connected with each other.

What is claimed is:

1. An on-board charging control apparatus being suitable for charging an on-board secondary battery using an on-board charger, wherein the charger, the charging control apparatus, and the secondary battery are mounted on a vehicle having a motor driven by electric power of the secondary battery, comprising:
- a present time outputting unit configured to output a time signal indicating a present time;
- a charging start signal receiving unit configured to receive a charging start signal outputted from the charger when off-board electricity is supplied to the charger and then charging of the secondary batter b the charger starts;
- an operation signal receiving unit configured to receive an operation signal indicating that an operation state setting switch for supplying of the secondary battery's power to each of running system ECUs and ignition system ECUs has been turned ON;
- a charging end target time setting unit configured to receive the time signal from the present time outputting unit in response to the reception of the operation signal in the operation signal receiving unit, and set a charging end target time based on the present time of the received time signal; and
- a charging control unit configured to receive the time signal from the present time outputting unit in response to the reception of the charging start signal in the charging start signal receiving unit, set a charging schedule, based on the charging end target time and the present time being indicated by the time signal received in response to the reception of the charging start signal, such that the secondary battery can be charged by the charger according to the charging schedule until the charging end target time, produce a charging control signal according to the charging schedule, and output the charging control signal to the charger such that the charger performs charging of the secondary battery according to the charging schedule.

2. The apparatus according to claim 1, wherein the charging end target time setting unit is configured to:
- obtain the present time of the time signal as an operation time each time the operation signal receiving unit receives the operation signal and then store them as a particular operation time zone in a memory,
- calculate a frequency of the operation times for each of a plurality of operation time zones based on the stored information, and
- set a certain time in the operation time zone corresponding to the high frequency as the charging end target time.

3. The apparatus according to claim 2, wherein charging of the secondary battery is gradually done such that the charging of the secondary battery is completed until the charging end target time.

4. The apparatus according to claim 2, wherein charging of the secondary battery is rapidly done at an applicative degree, thereafter charging of the secondary battery is completed until the charging end target time.

5. The apparatus according to claim 1, further comprising:
- a charging mode setting unit configured to set a charging mode in response to a charging mode setting signal,
- wherein the charging control unit is configured to set the charging schedule, when the charging mode setting unit sets the charging mode, such that the charging of the secondary battery will be started at the time being indicated by the time signal received in response to the reception of the charging start signal.

6. The apparatus according to claim 1, wherein the charging control unit is configured to set the charging schedule such that a charging power level of the charge to the secondary battery is changed during the charge.

7. The apparatus according to claim 1, further comprising:
- a first relay driving unit configured to turn on a first relay in response to the reception of the charging start signal in the charging start signal receiving unit; and
- a first relay signal receiving unit configured to receive a first relay signal which is outputted from the first relay when the first relay is turned on by the first relay driving unit,
- wherein the charging control unit is configured to set the charging schedule in response to one of the reception of the charging start signal in the charging start signal receiving unit and the reception of the first relay signal in the first relay receiving unit or in response to both the reception of the charging start signal in the charging start signal receiving unit and the reception of the first relay signal in the first relay receiving unit.

8. The apparatus according to claim 1, further comprising:
- a second relay driving unit configured to turn on a second relay in response to the reception of the operation signal in the operation signal receiving unit; and
- a second relay signal receiving unit configured to receive a second relay signal which is outputted from the second relay when the second relay is turned on by the second relay driving unit,
- wherein the charging end target time setting unit is configured to set the charging end target time in response to one of the reception of the operation signal in the operation signal receiving unit and the reception of the second relay signal in the second relay signal receiving unit or in response to both the reception of the operation signal in the operation signal receiving unit and the reception of the second relay signal in the second relay signal receiving unit.

9. The apparatus according to claim 1, wherein a microcomputer is configured to act as the charging start signal receiving unit, the operation signal receiving unit, the charging end target time setting unit and the charging control unit, the operation signal receiving unit is configured to receive each of a plurality of operation signals indicating respective operation states of the vehicle, the microcomputer and the present time outputting unit are configured to receive electric power from a battery of the vehicle to be activated at any time, regardless of the operation states, the microcomputer is configured to be set in a sleep mode in response to satisfaction of a sleep condition in the vehicle so as to stop operations of the charging end target time setting unit and the charging control unit of the microcomputer, and the sleep mode in the microcomputer is released in response to the reception of one reception signal in the operation signal receiving unit or the reception of the charging start signal in the charging start signal receiving unit so as to start operations of the charging end target time setting unit and the charging control unit.

10. The apparatus according to claim 1, wherein the present time outputting unit is a real time clock.

11. The apparatus according to claim 1, wherein the vehicle on which the apparatus is mounted is any one of a plug-in hybrid vehicle being able to obtain driving force from both an engine and a motor, an electric vehicle obtaining driving force only from a motor, and a fuel battery electric vehicle.

12. The apparatus according to claim 1, wherein the operation state setting switch is a user-operable push button switch.

13. The apparatus according to claim 1, wherein the operation state setting switch is an ignition switch.

14. The apparatus according to claim 1, wherein the operation state setting switch is a mechanical key.

15. A charging method being suitable for charging an on-board secondary battery by an on-board charging control apparatus using an on-board charger, wherein the charger, the charging control apparatus, and the secondary battery are mounted on a vehicle having a motor driven by electric power of the secondary battery, comprising:

receiving an operation signal indicating that an operation state setting switch for supplying the secondary battery's power to each of running system ECUs and ignition system ECUs has been turned ON and obtaining a time that the operation signal has been received;

setting a charging end target time based on the received time of the operation signal;

receiving a charging start signal outputted from the charger when off-board electricity is supplied to the charger, and obtaining a charging start time;

setting a charging schedule, based on the charging start time and the charging end target time, such that the secondary battery can be charged by the charger according to the charging schedule until a predetermined charging amount until the charging end target time; and charging the secondary battery by the charger according to the charging schedule.

16. The method according to claim 15, wherein charging of the secondary battery is gradually done such that the charging of the secondary battery is completed until the charging end target time.

17. The method according to claim 15, wherein charging of the secondary battery is rapidly done at an applicative degree, thereafter charging of the secondary battery is completed until the charging end target time.

\* \* \* \* \*